(12) United States Patent
Ajanovic et al.

(10) Patent No.: US 7,039,047 B1
(45) Date of Patent: May 2, 2006

(54) VIRTUAL WIRE SIGNALING

(75) Inventors: Jasmin Ajanovic, Portland, OR (US); David Harriman, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/433,654

(22) Filed: Nov. 3, 1999

(51) Int. Cl.
*H04L 12/56* (2006.01)

(52) U.S. Cl. .................. 370/389; 370/439; 370/465; 710/100; 710/107; 710/305

(58) Field of Classification Search ................ 370/389, 370/392, 395.1, 419, 439, 465; 710/100, 710/107, 117, 305, 126, 128, 129
See application file for complete search history.

(56) References Cited

U.S. PATENT DOCUMENTS

| | | | | |
|---|---|---|---|---|
| 4,734,908 A | * | 3/1988 | Hedlund | ............ 370/419 |
| 5,191,649 A | | 3/1993 | Cadambi et al. | |
| 5,206,946 A | | 4/1993 | Brunk | |
| 5,496,435 A | | 3/1996 | Abbott | |
| 5,533,204 A | | 7/1996 | Tipley | |
| 5,553,310 A | | 9/1996 | Taylor et al. | |
| 5,564,114 A | * | 10/1996 | Popat et al. | ............ 710/105 |
| 5,590,292 A | | 12/1996 | Wooten et al. | |
| 5,619,720 A | | 4/1997 | Garde et al. | |
| 5,621,897 A | | 4/1997 | Boury et al. | |
| 5,634,034 A | | 5/1997 | Foster | |
| 5,687,327 A | | 11/1997 | Arimilli et al. | |
| 5,687,388 A | | 11/1997 | Wooten et al. | |
| 5,696,768 A | | 12/1997 | Harriman et al. | |
| 5,761,444 A | | 6/1998 | Ajanovic et al. | |
| 5,764,932 A | | 6/1998 | Gochman et al. | |
| 5,774,681 A | | 6/1998 | Kunishige | |
| 5,832,243 A | | 11/1998 | Seeman | |
| 5,835,739 A | | 11/1998 | Bell et al. | |
| 5,856,975 A | * | 1/1999 | Rostoker et al. | ........ 370/395.64 |
| 5,857,082 A | | 1/1999 | Murdoch et al. | |
| 5,870,566 A | * | 2/1999 | Joh | ............ 709/251 |

(Continued)

FOREIGN PATENT DOCUMENTS

| | | |
|---|---|---|
| WO | WO 96/13777 | 5/1996 |
| WO | WO 99/15981 | 4/1999 |
| WO | WO 00/26798 | 5/2000 |
| WO | WO 01/31460 | 5/2001 |

*Primary Examiner*—Steven Nguyen
*Assistant Examiner*—Roberta A Stevens
(74) *Attorney, Agent, or Firm*—Blakely, Sokoloff, Taylor & Zafman LLP

(57) ABSTRACT

A method and apparatus for implementing virtual wire signaling is described. It includes an apparatus including a first component, a bus coupled to the first component, the bus to transmit packets of data, and a second component coupled to the bus, messages passed between the first component and the second component through packets transmitted on the bus.

24 Claims, 15 Drawing Sheets

U.S. PATENT DOCUMENTS

| | | |
|---|---|---|
| 5,870,567 A | 2/1999 | Hausauer et al. |
| 5,881,255 A | 3/1999 | Kondo et al. |
| 5,884,050 A * | 3/1999 | Wheeler et al. ............ 710/107 |
| 5,889,974 A | 3/1999 | Harriman et al. |
| 5,909,594 A | 6/1999 | Ross et al. |
| 5,911,052 A | 6/1999 | Singhal et al. |
| 5,918,025 A | 6/1999 | Hayek et al. |
| 5,930,485 A | 7/1999 | Kelly |
| 5,933,612 A | 8/1999 | Kelly et al. |
| 5,960,179 A * | 9/1999 | Hagersten .................. 710/107 |
| 5,961,623 A | 10/1999 | James et al. |
| 5,991,824 A | 11/1999 | Strand et al. |
| 6,009,524 A * | 12/1999 | Olarig et al. ............... 713/200 |
| 6,032,178 A | 2/2000 | Bacigalupo et al. |
| 6,088,370 A | 7/2000 | Bell |
| 6,098,134 A | 8/2000 | Michels et al. |
| 6,101,566 A | 8/2000 | Woods et al. |
| 6,112,265 A | 8/2000 | Harriman et al. |
| 6,145,039 A | 11/2000 | Ajanovic et al. |
| 6,170,025 B1 | 1/2001 | Drottar et al. |
| 6,175,884 B1 | 1/2001 | Harriman et al. |
| 6,181,708 B1 * | 1/2001 | Quackenbush et al. ..... 370/445 |
| 6,191,713 B1 * | 2/2001 | Ellis et al. ................... 341/100 |
| 6,199,159 B1 | 3/2001 | Fish |
| 6,253,270 B1 | 6/2001 | Ajanovic et al. |
| 6,272,563 B1 | 8/2001 | Ajanovic et al. |
| 6,292,705 B1 | 9/2001 | Wang et al. |
| 6,308,255 B1 | 10/2001 | Gorishek, IV et al. |
| 6,345,330 B1 * | 2/2002 | Chu ........................... 710/65 |
| 6,347,351 B1 | 2/2002 | Osborne et al. |
| 6,356,968 B1 | 3/2002 | Kishon |
| 6,374,317 B1 | 4/2002 | Ajanovic et al. |
| 6,378,020 B1 * | 4/2002 | Farmwald et al. .......... 710/129 |
| 6,425,033 B1 * | 7/2002 | Conway et al. ............. 710/128 |
| 6,434,639 B1 | 8/2002 | Haghighi |
| 6,446,154 B1 | 9/2002 | Ajanovic et al. |
| 6,480,965 B1 | 11/2002 | Harriman et al. |
| 6,496,895 B1 | 12/2002 | Harriman et al. |
| 6,516,375 B1 | 2/2003 | Ajanovic et al. |
| 6,532,019 B1 * | 3/2003 | Gulick et al. ............... 345/519 |
| 6,567,876 B1 | 5/2003 | Stufflebeam |
| 6,587,912 B1 * | 7/2003 | Leddige et al. ................. 711/5 |
| 6,594,713 B1 * | 7/2003 | Fuoco et al. ................. 710/31 |

* cited by examiner

VIRTUAL WIRE SIGNALING

BACKGROUND OF THE INVENTION

1. Field of the Invention

The present invention generally relates to the integrated circuit and circuit board design fields and more specifically to connection of components through use of buses in integrated circuits and circuit boards.

2. Description of the Related Art

As technology advances, and new products with advanced features appear, the need for backward compatibility and interoperability surfaces as a constraint in the design of prospective products. As an example, newer computers are expected to be capable of running software that predates the conception of the newer computers.

Prior art systems often use a configuration of components as illustrated in FIG. 1. CPU 101 (a Central Processor or Processor) is coupled through a Processor Bus 102 to a component referred to as a Host Bridge 105, and thereby coupled to the rest of the system. Host Bridge 105 is coupled to Memory 103, the main memory of the system, and Host Bridge 105 is also coupled to I/O Bridge 107 (Input/Output Bridge). I/O Bridge 107 couples to Keyboard 109, Mouse 111, and Disk Drive 110, and may couple to other components in a bus or point-to-point fashion. Through these couplings, CPU 101 is coupled to each component in the system, and may read or write information to each of the devices (within the capabilities of those devices).

Further extending the complexity of the system, PCI Bus 125 (Peripheral Component Interconnect Bus based on the Peripheral Component Interconnect Bus Specification Revision 2.1 or 2.2 from the Portland PCI Working Group as published by Intel Corporation) may be involved in the coupling of Host Bridge 105 to I/O Bridge 107, and may thereby couple to PCI Agents 120. Thus, through Host Bridge 105, CPU 101 may communicate with PCI Agents 120. While it is advantageous to make PCI Agents 120 available to the system, incorporating the PCI Bus 125 into a coupling or connection between the Host Bridge 105 and the I/O Bridge 107 further complicates the physical devices and layout, and the protocols for communication over that coupling.

FIG. 1B provides a simplified illustration of a subsystem from the system of FIG. 1A. FIG. 1B includes Host Bridge 105, I/O Bridge 107, and PCI Agents 120. Connected to each of these three components are A/D lines 195, PHLD (P Hold) 196, PHLD_ACK (P Hold Acknowledge) 197 and SERR# 198. PHLD 196, PHLD_ACK 197, and SERR 198 are signals well known in the implementation of the PCI Bus. All of A/D 195, PHLD 196, PHLD_ACK 197 and SERR# 198 are incorporated in PCI Bus 125 of is FIG. 1A, along with other signals not shown.

In the case of an upstream data transfer, one function of PHLD 196 and PHLD_ACK 197 is to arbitrate between components on the PCI bus. PHLD 196 is asserted by the I/O Bridge or whatever component is connected to it when that component will be transferring data upstream. In some embodiments, to ensure that the data transferred upstream will be correct, all pending downstream writes, such as data pending in the Host Bridge 105 which needs to be written downstream, must be written. Otherwise, data transferred upstream may be incorrect because a pending write was intended to modify that data. So, upon receiving PHLD 196, Host Bridge 105 will, in one embodiment, complete all downstream write transactions. Upon completion of those write transactions, Host Bridge 105 will assert PHLD_ACK 197, indicating Host Bridge 105 has received the PHLD 196 signal and is prepared for the upstream data transfer.

In other embodiments, the device asserting PHLD 196 may be capable of being the master of a bus other than the PCI Bus (such as an EISA bus) for an indefinite amount of time. In those instances, the device must also effectively be given control of the PCI Bus, so control of the PCI Bus is transferred when PHLD_ACK 197 is asserted, and control is not relinquished until PHLD 196 is deasserted.

SERR# 198 is a system error signal, which may be asserted by a pulse, rather than a steady high or low logic level. SERR# 198 is asserted in the case of errors associated with a transaction or an agent on the PCI Bus. As will be appreciated, most busses are more complicated than that illustrated in FIG. 1B, including the PCI Bus, which often uses at least six separate control signals, rather than the three illustrated.

It will be appreciated that many other signals may be incorporated into buses as separate pins on each component or wires connecting the components. Such signals may have assertion/de-assertion characteristics similar to PHLD 196 for example, or may be used in a pulsed manner more like SERR# 198, where any change in state either synchronous or asynchronous must be handled by the components. As these signals increase in number, routing of signals on an integrated circuit die or a circuit board becomes more complex, the number of pins and bond pads on individual integrated circuits may increase, and costs will correspondingly increase for both design and manufacture.

SUMMARY OF THE INVENTION

A method and apparatus for implementing virtual wire signaling is described. It includes an apparatus including a first component, a bus coupled to the first component, the bus to transmit packets of data, and a second component coupled to the bus, messages passed between the first component and the second component through packets transmitted on the bus.

BRIEF DESCRIPTION OF THE DRAWINGS

The present invention is illustrated by way of example and not limitation in the accompanying figures.

DETAILED DESCRIPTION

A method and apparatus for implementing virtual wire signaling is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The functioning and implementation of a hub interface is well described later in this application. However, a summary of that description in conjunction with an alternate embodiment will be useful as well.

Figure 2:
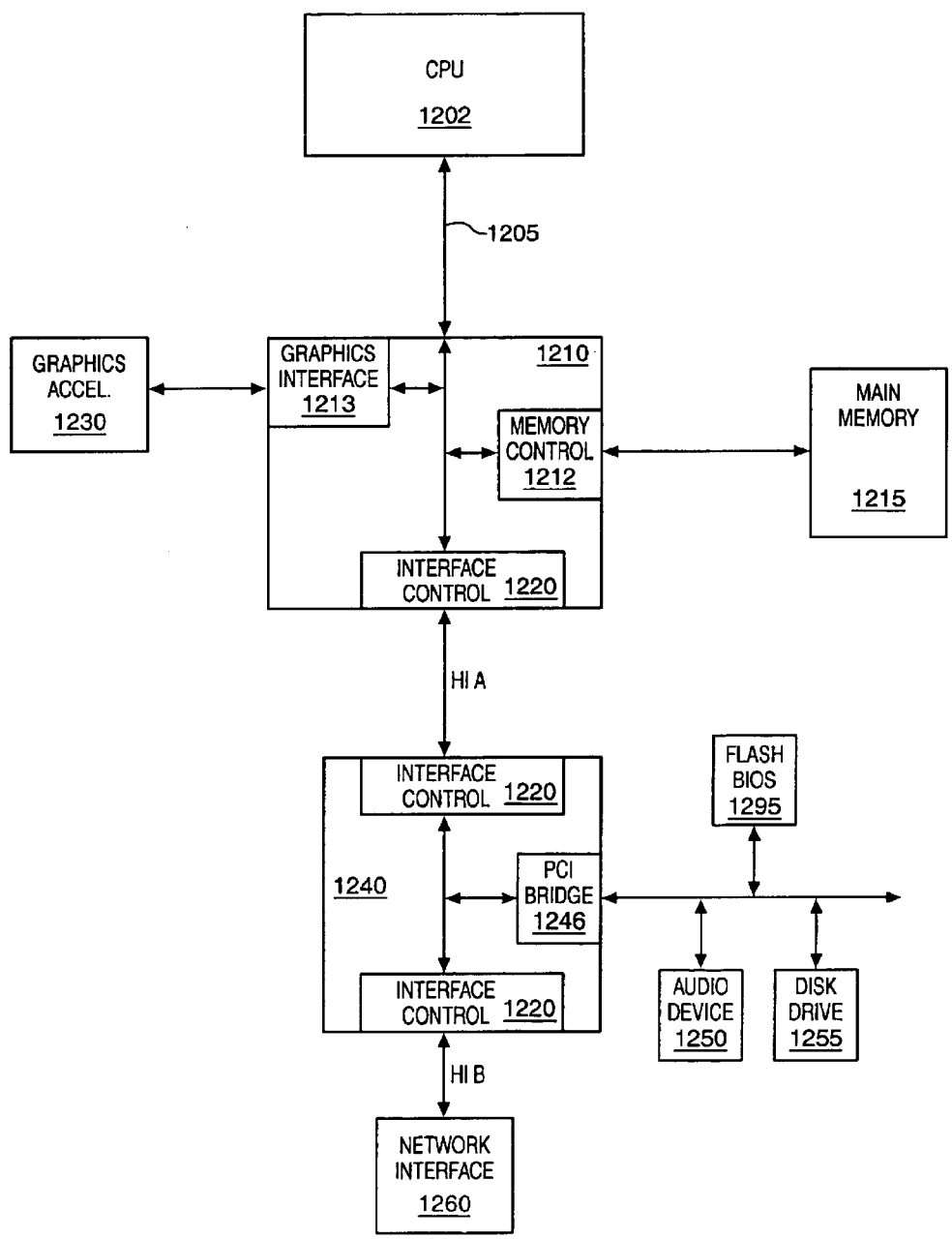
FIG. 2 illustrates a system.

FIG. 2 illustrates one embodiment of a system utilizing a hub interface. CPU 1202 is coupled through processor bus 1205 (the processor bus is also often referrred to as the CPU bus or the host bus) to Memory Control Hub (MCH) 1210. Processor bus 1205 may also be referred to as Host Bus 1205. MCH 1210 utilizes Memory Control 1212 to couple to Main Memory 1215, Graphics Interface 1213 to couple to Graphics Accelerator 1230, and Interface Control 1220 to couple to the rest of the system via hub interface (HI) A. ICH 1240 (Input/Output Control Hub) couples to hub interface A through Interface Control 1220. Internally, ICH 1240 utilizes PCI Bridge 1246 to couple to PCI Agents such as Audio Device 1250 and Disk Drive 1255 via a PCI Bus. ICH 1240 also utilizes another Interface Control 1220 block to couple to hub interface (HI) B and thereby to couple to Network Interface 1260. Furthermore, ICH 1240 couples to FLASH BIOS 1295, a basic input output system which, in one embodiment, is stored in a FLASH EPROM memory.

In one embodiment, the CPU 1202 and the MCH 1210 are combined into one component or integrated circuit. In an alternative embodiment, CPU 1202 and Graphics Accelerator 1230 are combined into one component or integrated circuit. In yet another alternative embodiment, MCH 1210 and Graphics Accelerator 1230 are combined into one component or integrated circuit. In still another alternative embodiment, CPU 1202, MCH 1210 and Graphics Accelerator 1230 are combined into one component or integrated circuit. It will be appreciated that the practice of the invention need not be limited to a specific configuration combining or separating the functions represented by the functional blocks of, for example, FIG. 2. It will be appreciated that the components illustrated in FIG. 2 may be separate components or may be integrated on a single integrated circuit. Similarly, components in, for example, FIG. 3 may be integrated or discrete and still be within the spirit and scope of the invention.

In one embodiment, the hub interface is a narrow-width, high throughput communications link using packets of information, each packet encoding a request or completion. The packets include various fields and are broken into a series of data words transmitted on a set of wires, such that most of the control information for the hub interface is embedded in the packets, reducing the need for additional control signals as a sideband separate from the data. Information may be said to travel either downstream, away from the processor or CPU, or upstream. Components linked to the bus are referred to as agents, and are often referred to as a downstream or upstream agent depending on the point of reference of the description. For instance, relative to the MCH 1210, the Disk Drive 1255 is a downstream agent in FIG. 2.

Packets on the hub interface, in one embodiment, embody requests or completions. Requests may contain an address to which the request is directed and may also include control information and data as appropriate. For example, a request that an agent write data to a storage location would include the data to be written, and may also include a request for completion. Special cycles are also a form of request, and are generally used for system management functions (special cycles are described in more detail below). Also, reads and writes may be performed without addresses in some circumstances. Completions include information indicating whether and how the task was completed, such as completion status codes (including indications of potential error conditions or successful completion of a transaction), and may also include data. Thus, a completion corresponding to a read request may include the data read along with an indication of whether any errors occurred in the reading. In the case of a completion corresponding to a write request, an indication of any possible errors or of successful completion is included, but no data is included.

In one embodiment, the hub interface may also be used to transmit special cycle packets which embody control information. Such special cycles may be transmitted between the transmission of packets for read or write data, and may alter the flow of information or the performance of components involved in the hub interface. Special cycles may be packets including only a header, or may include an address or data as appropriate. In some instances, special cycles may result in a completion, too.

In one embodiment, CPU 1202 initiates a transaction, either read or write, on processor bus 1205. The transaction includes an address and may include data if it is a write. The address indicates where the transaction is targeted. If the transaction is targeted at Main Memory 1215, MCH 1210 carries it out and returns the data or results to CPU 1202. Similarly, if the transaction is targeted at Graphics Accelerator 1230, the MCH performs the transaction and returns the data or results to CPU 1202. If the target is further down the hub interface hierarchy, the MCH 1210 transforms the transaction into a request packet and passes it down the hub interface HI A to the ICH 1240. The ICH 1240 interprets the packet and determines the target of the request, and then appropriately signals that target for either a read or a write as necessary. If a completion is requested in the case of a write, or for any read, the ICH 1240 passes a packet back up the hub interface HI A, with the appropriate data and/or completion status codes.

Further, in one embodiment, special cycles may come from the MCH 1210 to the ICH 1240 in response to transactions on the processor bus 1205, which may cause the ICH 1240 to adjust its performance or activity, including but not limited to signaling errors to devices connected to the ICH 1240 or acting as if an error signal was received from a device connected to the ICH 1240.

Figure 3:
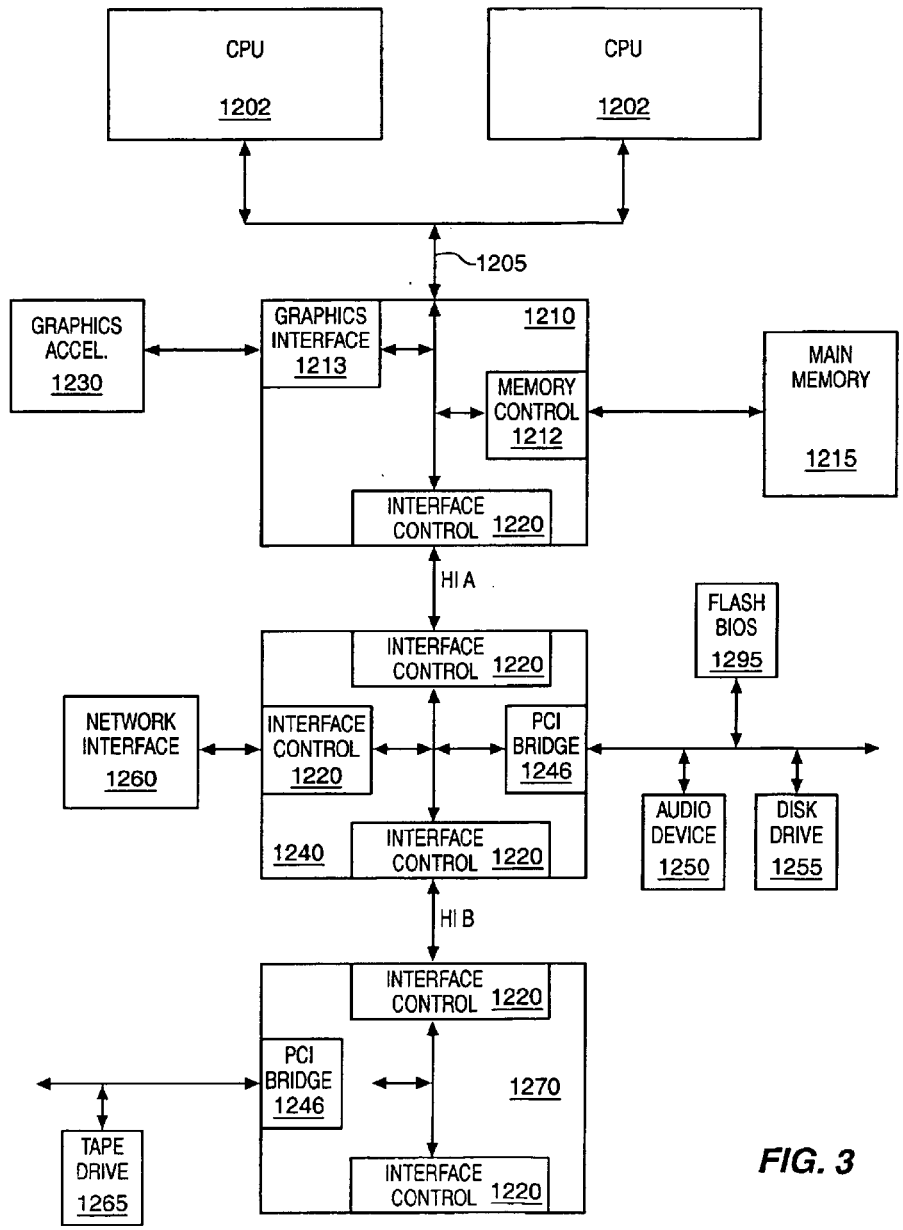
FIG. 3 illustrates an alternative embodiment of a system.

The hub interface allows for much flexibility in a system, as illustrated in FIG. 3. In this illustration, two CPUs 1202 are coupled through processor bus 1205 to MCH 1210. As in FIG. 2, MCH 1210 couples to Main Memory 1215 and Graphics Accelerator 1230. ICH 1240 couples through PCI Bridge 1246 and a PCI bus to Audio Device 1250, Disk Drive 1255, and FLASH BIOS 1295. ICH 1240 also couples to Network Interface 1260. However, ICH 1240 is coupled directly to Secondary Hub 1270 through hub interface B (HI B). Note that this coupling occurs between two Interface Control 1220 components, one in ICH 1240 and one in Secondary Hub 1270. Secondary Hub 1270, in this embodiment, includes another PCI Bridge 1246, which couples to Tape Drive 1265 through a PCI bus.

In one embodiment, a first CPU 1202 may initiate a read of the Tape Drive 1265 on processor bus 1205. This read is passed as a packet by the MCH 1210 to the ICH 1240. The ICH 1240 determines from the address in the packet that the packet is targeted to the downstream hub interface where the Tape Drive 1265 may be found (the ICH 1240 does not determine specifically where the read is bound, only where to pass it next based on address information contained within the request packet), and therefore passes the packet on along hub interface HI B to Secondary Hub 1270. Secondary Hub 1270 receives the packet and determines that it targets the Tape Drive 1265, and then initiates the read of Tape Drive 1265. Upon receiving the data or error signal from the Tape Drive 1265, the Secondary Hub 1270 packages the results in a completion packet which it sends upstream along hub interface HI B to the ICH 1240. The ICH 1240 determines that the packet is a completion bound for the upstream hub interface HI A (where first CPU 1205 may be reached), and passes the packet upstream along the hub interface HI A to the MCH 1210. The MCH 1210 determines also that the packet is a completion bound for the processor bus 1205. The MCH 1210 issues completion of the read sequence on the processor bus 1205 and provides the read data that was received in a hub interface packet sent by Tape Drive 1265.

Figure 1A:
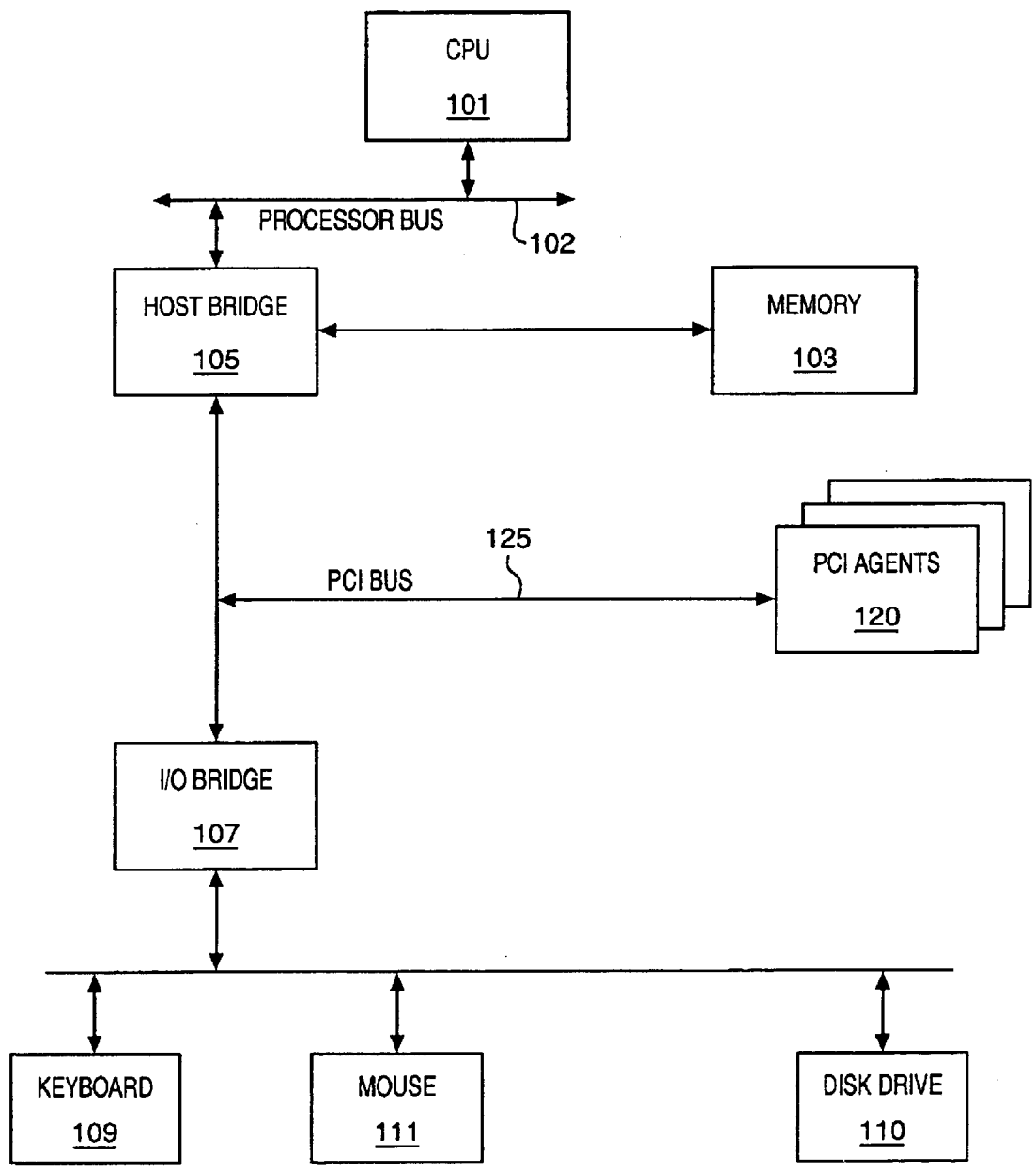
FIG. 1A illustrates a prior art bus and component combination.
Figure 1B:
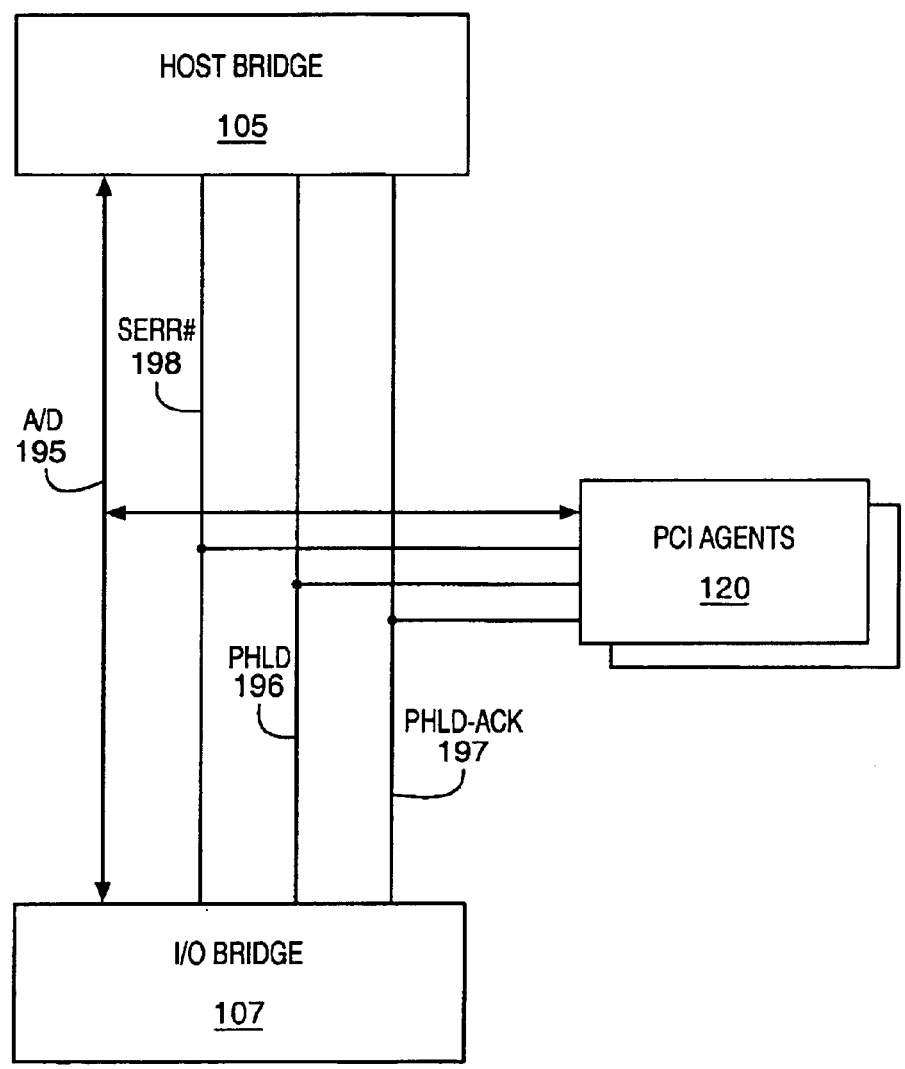
FIG. 1B illustrates a prior art subsystem.

It will be appreciated that encoding signals as messages has more value if more than two signals are encoded thereby. For example, encoding both assert and de-assert commands in messages for the control lines for a new component used in the combination of components of FIG. 1B or other implementations of the PCI Bus would allow for control of the corresponding bus without requiring the additional lines for control signals. As such, this encoding method and apparatus allows a designer of a circuit board to avoid the extra effort and resources required to route signals replaced by the encoded messages. Likewise, chip designers need not bond out additional pins for such signals. Furthermore, this method and apparatus may be applied to design interconnection between portions of a single chip, thus saving routing resources while utilizing proven designs for older portions of a chip. All of these advantages embody the advantage of greater economy in designing integrated circuits and systems. Economies may be realized in terms of design time and effort, and may also be realized in terms of reduced space on an integrated circuit, reduced pins or leads in packaging, reduced wiring requirements on system boards, and ultimately in reduced cost to both produce and use the integrated circuits or other embodiments.

In the prior art each signal from a component was passed through a wire to the rest of the system, but the hub interface HI A does not contain the extra wires to pass each signal directly to the rest of the system. Instead, hub interface HI A is implemented with lines for passing packets and just enough additional signals to implement flow control between components. If a signal such as PHLD is asserted on the PCI Bus and received by PCI Bridge 1246, that signal is passed as a message in a special cycle by ICH 1240 on hub interface HI A to MCH 1210. Likewise, a signal on PCI Bus 1240, or any other bus or coupling to ICH 1240, may be asserted as a result of a message passed from MCH 1210 along hub interface HI A to ICH 1240. Furthermore, if ICH 1240 is coupled to a third bus of a different kind, and MCH 1210 has proper information on the signals of the third bus, MCH 1210 and ICH 1240 may understand and act on or respond to messages on hub interface HI A which correspond to activity on the third bus.

It will be appreciated that encoding signals in this manner reduces or eliminates the need to add and remove pins or wires from a design due to changes in the underlying components in a system. Previously, a board designer using an old board design with a newer integrated circuit might have to tie an outdated signal line to a resistor coupled to a steady power or ground signal to avoid side effects of having the outdated signal on the board. Utilizing the message passing style of sending signals, pins on integrated circuits and wires on boards need not be added or removed, as the hub interface components may be configured to recognize the new signals and configurations related to the old signals may be discarded.

Furthermore, it will be appreciated that use of a hub interface may involve cascading and multiple components (such as CPU 1202 for example) as illustrated in FIG. 3. In such a system, it will be appreciated that a component on either end of a hub interface may either act upon a message or forward/transfer that message further along. Additionally, a message may be ignored if appropriate. If an error signal is asserted by Tape Drive 1265, that will result in a message passed from Secondary Hub 1270 to ICH 1240. ICH 1240 may either act upon the message, or ICH 1240 may pass the message to MCH 1210. Likewise, MCH 1210 may send a message intended to assert a signal to one of PCI Agents such as Audio Device 1250 or Disk Drive 1255. In such a situation, ICH 1240 will assert the signal through PCI Bridge 1246 and not pass the message on to Secondary Hub 1270. However, if MCH 1210 sent a message intended to assert a signal to Tape Drive 1265, that message would be transferred by ICH 1240 to Secondary Hub 1270, and Secondary Hub 1270 would assert the signal to Tape Drive 1265.

It will also be appreciated that signals which are pulses may also be encoded in messages or special cycles. For instance, a system reset signal may be implemented as a pulse. Either receiving or sending such a signal may be encoded in a special cycle for transmission on the hub interface, with decoding of the special cycle resulting in proper processing of the signal. Another example of such a signal is the SERR# signal Qf the PCI Bus, which may be pulsed by a PCI Agent, and the receipt of such a pulse by the ICH 1240 may result in transmission of a special cycle encoding the receipt of the SERR# pulse.

Figure 4:
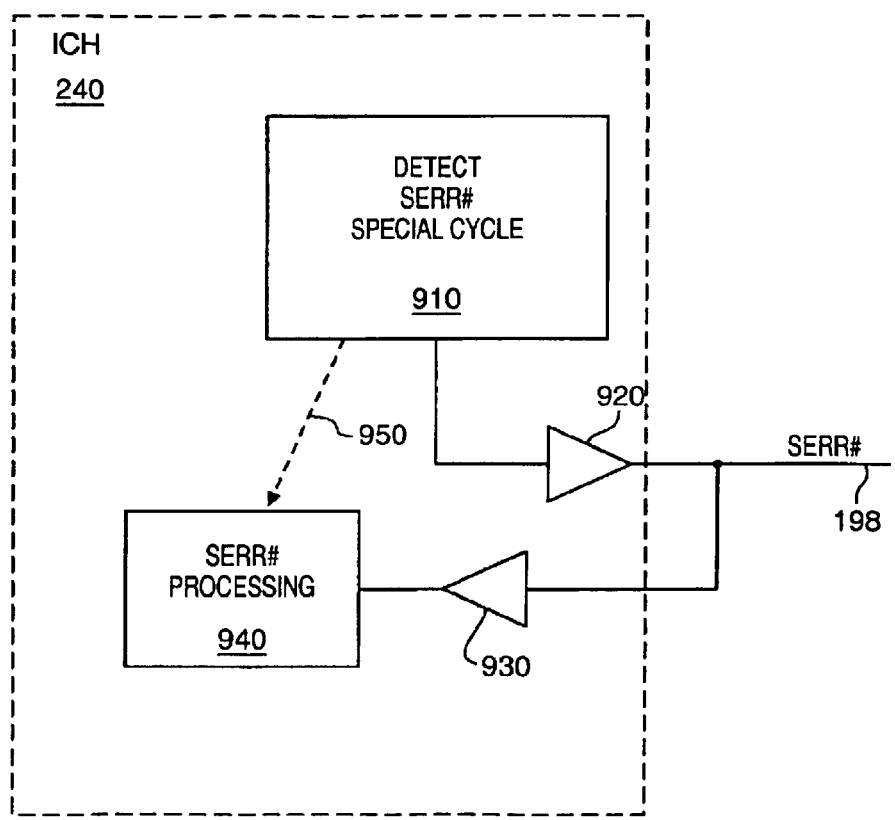
FIG. 4 illustrates the portion of a component dedicated to processing of a special cycle, and a signal.

Likewise, it will be appreciated that acting on a special cycle or message may take several forms. For instance, a special cycle may encode a command to assert a signal such as PHLD. Acting on the special cycle in that case results in asserting PHLD 196. However, a special cycle may also encode a command to act as if SERR# 198 was received. FIG. 4 illustrates one embodiment of the logical structure used to act on such a command. Depending on the situation, ICH 1240 may need to assert SERR# 198 to allow the rest of the system (such as Disk Drive 1255 for example) to also act as if SERR# 198 was asserted. In that case, Detection block 910 detects the SERR# special cycle and asserts SERR# 198 through buffer 920. Buffer 930 then presents the asserted SERR# 198 signal to SERR# Processing 940, which carries out the command of the SERR# special cycle. However, it may be more desirable for ICH 1240 to behave as if SERR# 198 was asserted without asserting SERR# 198. In that case, path 950 allows Detection block 910 to activate SERR# Processing 940 without actually asserting SERR# 198.

Figure 5:
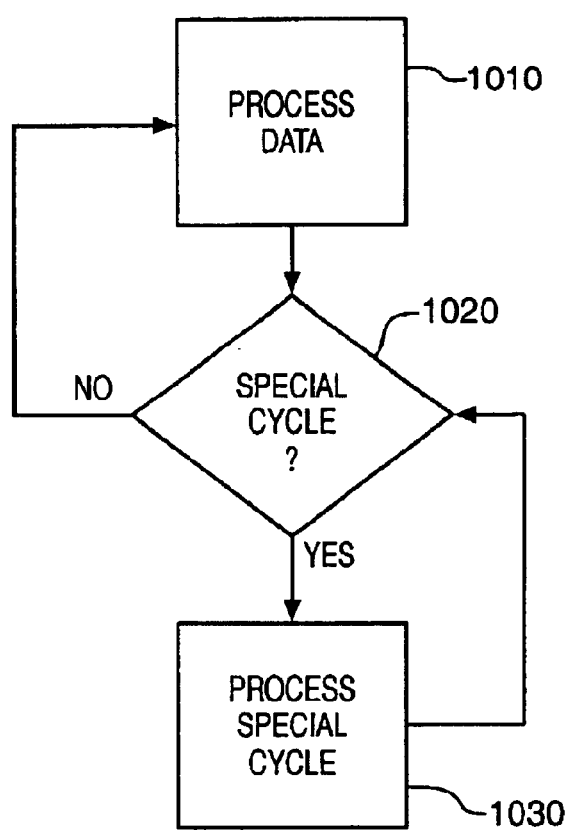
FIG. 5 illustrates a method of processing data and special cycles.

The method of implementing virtual wire signals may be distilled into the method illustrated in FIG. 5. Process Data 1010 is the normal state of the method, but it proceeds directly to Special Cycle check 1020 for each packet. If no Special Cycle is found, the method proceeds back to Process Data 1010. However, if a special cycle is found, the method proceeds to Process Special Cycle 1030. At Process Special Cycle 1030, the Special Cycle is either processed (acted upon), transferred or forwarded, or ignored. The method then returns to Special Cycle check 1020.

It will be appreciated that the signals that may be encoded include those signals from other bus protocols such as traditional special cycles, power management signals, buffer management and ordering messages, interrupt and error messages, and miscellaneous system messages. Likewise, hub interface operational messages may also be encoded. Thus, what was previously implemented as sideband control signals may now be implemented as in-band or embedded control or special cycles.

As a further example, in one embodiment, each special cycle has a cycle type of '11' (as opposed to '00' for memory, '01' for IO, or '10' for configuration) in the header packet. The same header packet also includes in the special cycle encoding field (the byte enable field of a non-special cycle) a bit sequence of '0111 101a' for a PHLD signal, where a =1 for assertion and 0 for de-assertion. For a PHLD_ACK signal, the bit sequence in the byte enable field is '0111 111a' with the same a =1 for assertion and 0 for de-assertion. Also, to tell an ICH to assert the SERR# signal, the bit sequence of the byte enable field is '1001 0010' (without a variable field for assertion/de-assertion). Other signals naturally have other bit sequence encodings.

Figure 6:
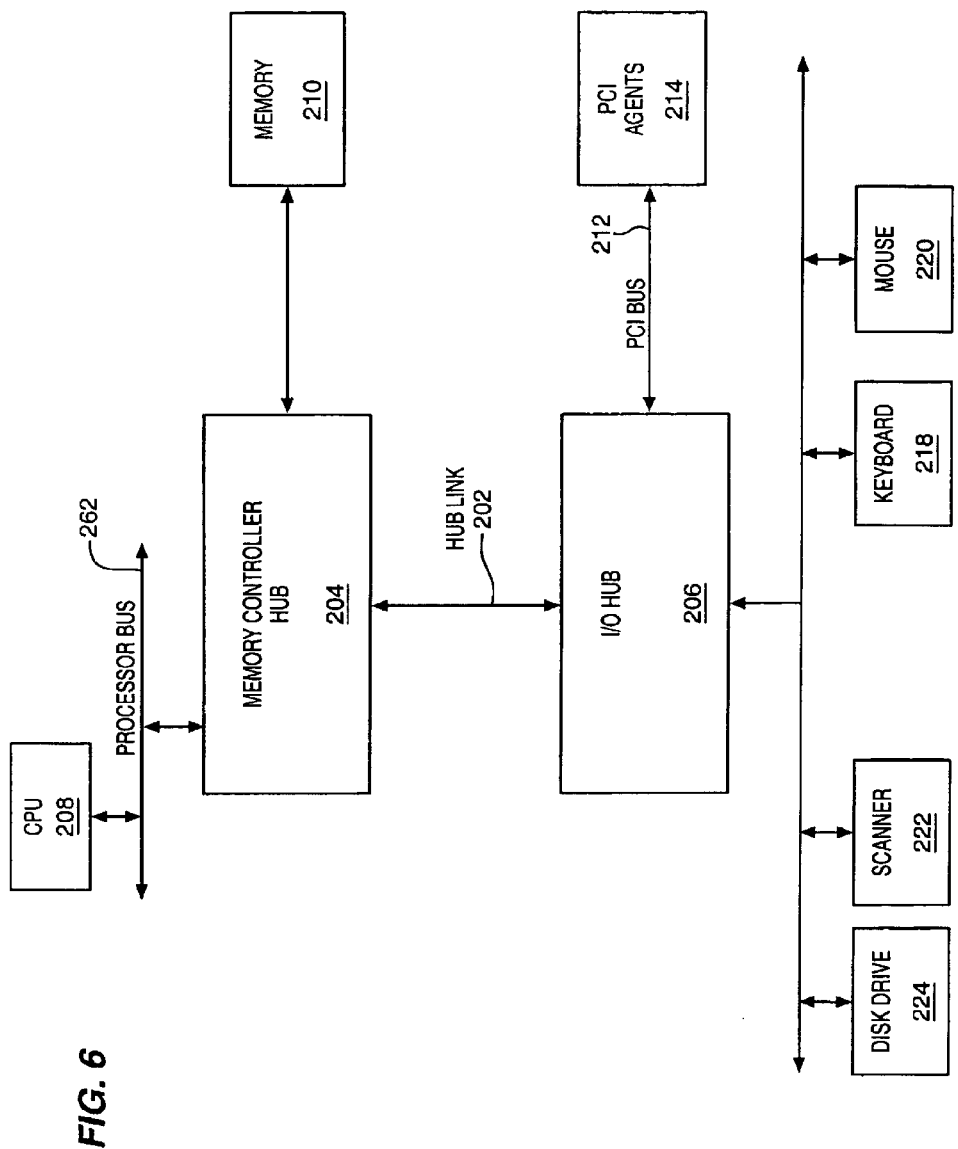
FIG. 6 is a block diagram of one embodiment of a computer system implementing the improved interface between computer components.

A more detailed description of a hub interface follows. It will be appreciated that this description illustrates some of the alternatives for implementing the hub interface. As illustrated in FIG. 6, one embodiment of the hub interface provides individual components with a point-to-point interface. In alternative embodiments, however, the hub interface may provide an interface between three or more components.

More specifically, FIG. 6 illustrates one embodiment of the hub interface 204 used to interconnect two separate components (i.e., hub agents) within a chipset. The hub agents provide a central connection between two or more separate buses and/or other types of communication lines.

For example, as further shown in FIG. 6, the chipset includes a memory controller hub 204 (MCH) and an input/output (10) hub 206. The memory controller hub 204, as shown in FIG. 6, provides an interconnection/hub between one or more Central Processing Units 208 (CPU) and the system memory 210. The CPU 208 is coupled to a Processor Bus 262 which is couple to the MCH 204.

The I/O hub 206 provides an interconnection between various peripheral components within the system (e.g. a keyboard 218, disk drive 224, scanner 222 and/or mouse 220.) Moreover, the external busses and their agents (e.g., PCI bus 212 and PCI agents 214), interconnect indirectly with the memory 210 and CPU 208 via the hub interface 202, by interconnecting with the I/O hub 206, rather than interconnecting directly with the memory controller hub 204.

By using the hub interface to interconnect the memory controller hub 204 and the I/O hub 206, improved access is provided between VO components and the CPU/memory subsystem (e.g., increased bandwidth, protocol independence, and lower latency.) In addition, the hub interface may also improve the scalability of a computer system (e.g., upgrading from a base desktop platform to high-end desktop platforms or workstation platform) by providing a backbone for I/O building blocks.

To provide the improved interface, the hub interface includes one or more unique features. In one embodiment, transactions are transferred across the hub interface using a packet based split-transaction protocol. For example, a Request Packet is used to start a transaction and a separate Completion Packet may subsequently be used to terminate a transaction, if necessary.

Figure 7:
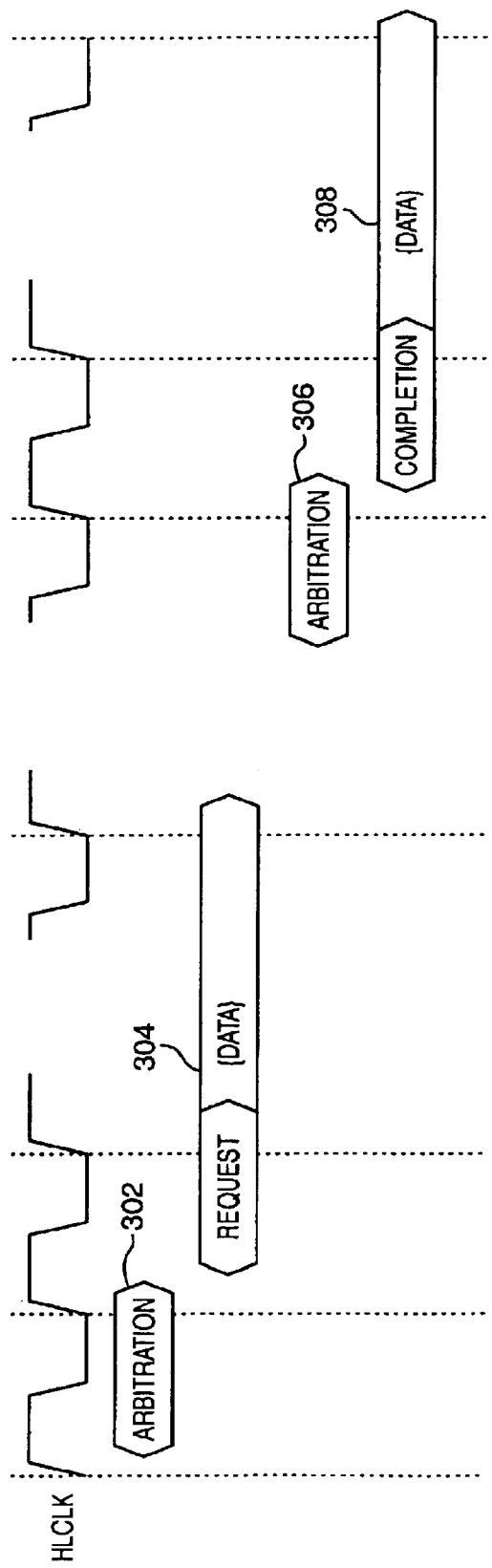
FIG. 7 is a timing diagram illustrating a split transaction implemented by one embodiment of an interface.

FIG. 7 illustrates an example of a split transaction across the hub interface. As illustrated in FIG. 7, a hub agent initially obtains ownership of the hub interface via arbitration 302. Following the arbitration, there is a request phase 304. If necessary (e.g., in the case of returning data for a read transaction), a completion phase 308 will follow the request phase. Prior to the completion phase, however, the responding hub agent, will first arbitrate 306 for ownership of the hub interface.

In between the time of transmitting a request packet and a corresponding completion packet across the hub interface, separate unrelated packets may be transmitted across the hub interface in accordance with predetermined order rules, as discussed below in more detail. For example in the case of a read request from a peripheral to memory, providing the requested data may take multiple clock cycles to have the data ready to be returned in a completion packet. During the time it takes to obtain the requested data, separate unrelated completion and/or request packets waiting in a queue/pipe of the memory controller hub 204, may be transmitted to the I/O hub 206.

Furthermore, as shown in FIG. 7, each request or completion is transmitted as a packet across the interface. For write type transactions, data is associated with the request. For read type transactions, there will be data associated with the completion. In some cases, there will be more than one completion for a request for the case where the completion packet is disconnected, effectively splitting it into multiple completion packets.

In addition, in one embodiment, the hub interface uses transaction descriptors for routing of hub interface traffic as well as identifying the attributes of a transaction. For instance, the descriptors may be used to define a transaction as isochronous or asynchronous, which, as a result, may then be handled in accordance with a predefined protocol.

Furthermore, in one embodiment, the bandwidth of the interface is increased in part by transmitting the data packets via a source synchronous clock mode. Moreover, in one embodiment, the hub interface provides the increased bandwidth despite using a narrow connection (e.g., less pins/pads).

In alternative embodiments, however, a hub interface may be implemented with less than all of the unique features as discussed above, without departing from the scope of the invention. Moreover, the hub interface could also be used to interconnect bridges and and/or other components within or external to a chipset, without departing from the scope of the present invention.

TRANSACTION, PROTOCOL AND PHYSICAL LAYERS

For greater clarity, the hub interface is described in three parts; a transaction layer; a protocol layer; and a physical layer. The distinctions between layers, however, is to be regarded in an illustrative rather than a restrictive sense, and is therefore does not to imply a particular preferred embodiment.

Transaction Layer

In one embodiment of the hub interface, the transaction layer supports the routing of separate transactions transmitted across the hub interface (which may consist of one or more packets.) For example, in one embodiment, the transaction layer of the hub interface generates transaction descriptors, which are included in the requests and data packets. The transaction descriptors may be used to support arbitration between queues within a hub agent (e.g., MCH), and/or to facilitate routing of requests and data packets through the hub interface.

For instance, in one embodiment, the transaction descriptors support routing of completion packets back to the request-initiating agent based on initially supplied (within a request packet) routing information. The transaction descriptors also help to reduce or possibly minimize packet-decoding logic within the hub agents.

In alternative embodiments, the transaction descriptors also provide the ability to distinguish the handling of requests based on their respective transaction attributes. For instance, the transaction attributes identified in the transaction descriptors may identify operations as Isochronous (i.e., operations that move fixed amounts of data on a regular basis; e.g., video or audio real time operations.) As a result, the operations, as identified by the transaction attributes, may be handled in accordance with a corresponding predetermined routing protocol in order to support a specific type of operation (e.g., isochronous.)

In one embodiment, the transaction descriptors include two fields: a routing field and an attribute field. In alternative embodiments, more or less fields may be used to provide one or more of the functions of the transaction descriptors, without departing from the scope of the invention.

In one embodiment, the routing field is a six-bit field used for packet routing, as shown below in Table 1. The size of the routing field, as well as the attribute field, may vary within the scope of the invention.

TABLE 1

Routing Field of Transaction Descriptor

| 5 | 4 | 3 | 2 | 1 | 0 |
|---|---|---|---|---|---|
| Hub ID | | | Pipe ID | | |

As shown in Table 1, three bits of the routing field are used for the Hub ID which identifies the hub agent that initiated the transaction. In alternative embodiments, to provide a hub interface hierarchy exceeding 8, additional bits could be used in the routing field.

Figure 8:
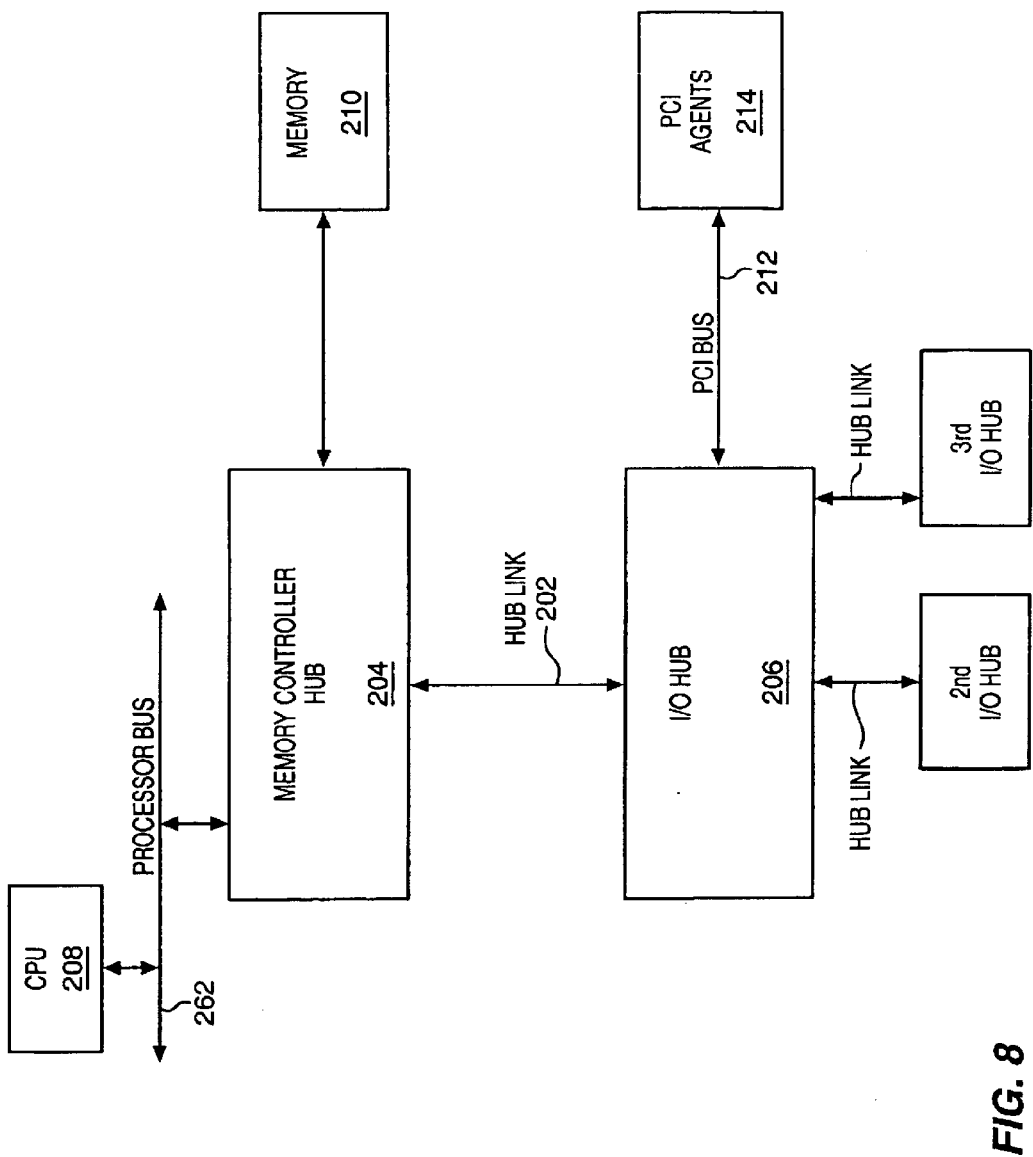
FIG. 8 is a block diagram of one embodiment of a computer system implementing a hierarchy of multiple improved interfaces between computer components.

For example, there may exist multiple hub interface hierarchies in a system, in which case the agent at the top of the hierarchies should be capable of routing completions back to the base of the hierarchy. In this context, "hierarchy" consists of multiple connected hub interface segments starting from a hub interface "root" agent (e.g., a Memory Control Hub.) For instance, FIG. 6 illustrates a system having only one hub interface hierarchy. FIG. 8, however, illustrates an example of system based on two hub interface hierarchies. In embodiments implementing only one hub interface hierarchy, a default value of "000" may be used in the Hub ID field.

The remaining three bits of the routing field may be used to identify internal pipes/queues within a hub interface agent. For example the I/O Control Hub may support internal USB (Universal Serial Bus) host controller traffic and Bus Mastering ID (BM-ID) traffic via separate "pipes." (USB refers to the Universal Serial Bus Specification version 1.0 adopted in 1996 available from the USB Implementers'Forum and its follow-on specifications.) As such, the Pipe ID may be used communicate to the servicing agent (e.g., MCH) that traffic initiated by different "pipes" have different attributes, and may be handled in accordance with a predetermined protocol. If a hub interface agent does not implement separate internal pipes, it may use a default value of '000', in the Pipe ID field.

In an alternative embodiment, the transaction descriptors further include an attribute field. In one embodiment, the attribute field is a three-bit value, which specifies how a transaction is to be handled when a target hub interface agent receives it. In some cases, the attribute field helps a system support demanding application workload, which relies on the movement, and processing of data with specific requirements or other differentiating characteristics.

For example, the attribute field may support the isochronous movement of data between devices, as used by a few recently developed external busses such as IEEE 1394-compliant and USB-compliant busses. (IEEE-1394 refers to the IEEE 1394-1995 Specification adopted in 1995 and available from the Institute of Electrical and Electronics Engineers and its follow-on specifications.) Such data movement requirements need to be maintained as data flows through the hub interface between I/O devices and the CPU/memory subsystem.

In alternative embodiments, additional transaction attributes may include the ability to differentiate between "snooped" traffic where cache coherency is enforced by hardware (i.e., chipset) and "non-snooped" traffic that relies on software mechanisms to ensure data coherency in the system. Moreover, another possible attribute would be an "explicitly prefetchable" hint, to support a form of read caching and allow for more efficient use of the main memory bandwidth.

Ordering Rules

The transaction descriptors can also be used to support ordering rules between transactions transmitted across the hub interface. For example, in one embodiment, transactions with identical transaction descriptors are executed in strong order (i.e., first come—first sere.)

Transactions having the same routing field but different attribute fields, however, may be reordered with respect to each other. For example, in one embodiment, isochronous transactions do not need to be strongly ordered with respect to asynchronous transactions.

In addition, in one embodiment of the hub interface, data transmissions are permitted to make progress over requests, either in the same direction or the opposite direction. Read completions flowing in one direction are allowed to pass read requests flowing in the same direction. And, write requests are allowed to pass read requests flowing in the same direction.

In alternative embodiments, however, the ordering rules for transactions travelling across the hub interface, may vary within the scope of the invention. For example, in one embodiment, the hub interface implements the ordering rules provided in Peripheral Component Interconnect (PCI) (Revision 2.2) to determine the flow of traffic across the hub interface in opposite directions.

Protocol Layer

In one embodiment, the hub interface uses a packet-based protocol with two types of packets: request and completion. A request packet is used for each hub interface transaction. Completion packets are used where required, for example, to return read data, or to acknowledge completion- of certain types of write transactions (e.g., I/O writes and memory writes with requested completion). Completion packets are associated with their corresponding request packets by transaction descriptors and ordering, as previously discussed in the section on the Transaction Layer.

In addition, in one embodiment, the hub interface uses an arbitration protocol that is symmetric and distributed. For example, each hub agent drives a request signal, which is observed by the other agent attached to the same interface. No grant signal is used, and agents determine ownership of the interface independently.

Moreover, in one embodiment, no explicit framing signal is used. There is an implied relationship between the arbitration event that gives an agent ownership of the interface and the start of that agent's transmission. In alternative embodiment, framing signals could be used without departing from the scope of the invention.

The end of a packet transmission occurs when a hub interface agent that owns he interface (e.g., is in the process of transmitting data), releases its control of the nterface by de-asserting a request signal. In addition, in one embodiment, flow control s also accomplished by using a STOP signal to retry or disconnect packets, as is described in more detail below.

Packet Definition

In one embodiment of the hub interface, data is transferred at a multiple rate (e.g., 1×, 4×, 8×) of the hub interface clock (HLCK), which in one embodiment is a common clock shared by the hub agents joined by the hub interface. The data is transmitted across a data signal path (PD) of the hub interface, which has an "interface width" of some power of two (e.g., 8, 16, 24, 32.) As a result, the hub interface may have varying data transfer granularities (i.e., transfer widths), depending upon the transfer rate and the width of the data signal path. For example, in the case of an eight-bit interface width in 4×mode, the transfer width is 32 bits per HLCK. As a result, by varying the transfer rate and/or the interface width of the data signal path, the transfer width (i.e., number of bytes transferred per HLCK) can be scaled.

In addition, in one embodiment, packets may be larger than the transfer widths. As a result, the packets are transmitted in multiple sections (i.e., packet widths.) In one embodiment, the packets are divided into packet widths the size of double words (32 bits).

In the case of a 32 bit transfer width, the bytes of a packet width are presented on the interface starting with the least significant byte (byte 0) and finishing with the most significant byte (byte 3), as shown below in Table 2. In the case of a 64 bit transfer width (e.g., a sixteen bit wide interface in 4×mode) the less significant double-word (packet width) is transferred on the lower bytes of the data signal (e.g., PD

[0:7]) and the more significant double-word is transferred in parallel on the upper bytes of the data signal (e.g., PD [15:8]). The two examples are shown below in table 2.

TABLE 2

Byte Transmission Order for 8 and 16 Bit Interface Widths

HLCLK / ‾\_/‾\_
PD [7:0] ⟩0⟩1⟩2⟩3⟩4⟩5⟩6⟩7⟩

8 Bit Interface

HLCLK / ‾\_/‾\_
PD [7:0] ⟩0⟩1⟩2⟩3⟩
PD [15:8] ⟩4⟩5⟩6⟩7⟩

16 Bit Interface

The Protocol Layer of the hub interface is also responsible for framing the data. As such, the framing rules implemented by the hub interface define how to map one or more packet widths onto a set of transfer widths. To simplify the parsing of packets into packet widths, in one embodiment of the hub interface, the following three framing rules are implemented: a header section of a packet starts on the first byte of a transfer width; a data section of a packet (if present) starts on the first byte of a transfer width; and a packet occupies an integral number of transfer widths.

Any available transfer widths not consumed by a packet may be filled with a bogus double word (DW) transmission, and will be ignored by the receiving hub agent. In alternative embodiments, more, less, and/or different framing rules may be used by the hub interface within the scope of the present invention.

Table 3 and Table 4 set forth below, illustrate examples of the framing rules given above for the case of a 64 bit transfer width.

TABLE 3

Request using 32 Bit Addressing and
Containing Three Double-words of Data

| 4th Byte Transmitted on PD[15:8] | 3rd Byte Transmitted on PD[15:8] | 2nd Byte Transmitted on PD[15:8] | First Byte Transmitted on PD[15:8] | 4th Byte Transmitted on PD[7:0] | 3rd Byte Transmitted on PD[7:0] | 2nd Byte Transmitted on PD[7:0] | First Byte Transmitted on PD[7:0] |
|---|---|---|---|---|---|---|---|
| Byte 7 | Byte 6 | Byte 5 | Byte 4 | Byte 3 | Byte 2 | Byte 1 | Byte 0 |
| Address (32b) | | | | Request Header | | | |
| Second DW of Data | | | | First DW of Data | | | |
| {Dummy DW} | | | | Third DW of Data | | | |

TABLE 4

Request using 64 Bit Addressing and
Containing Three Double-words of Data

| 4th Byte Transmitted on PD[15:8] | 3rd Byte Transmitted on PD[15:8] | 2nd Byte Transmitted on PD[15:8] | First Byte Transmitted on PD[15:8] | 4th Byte Transmitted on PD[7:0] | 3rd Byte Transmitted on PD[7:0] | 2nd Byte Transmitted on PD[7:0] | First Byte Transmitted on PD[7:0] |
|---|---|---|---|---|---|---|---|
| Byte 7 | Byte 6 | Byte 5 | Byte 4 | Byte 3 | Byte 2 | Byte 1 | Byte 0 |
| Address (31:2) | | | | Request Header | | | |
| {Dummy DW} | | | | Address (63:32) | | | |
| Second DW of Data | | | | First DW of Data | | | |
| {Dummy DW} | | | | Third DW of Data | | | |

Request Packets

The packet header format for request packets, according to one embodiment, is shown below in Table 5 and Table 6. In the examples shown in Tables 5 and 6, the base header is one double-word, with one additional double-word required for 32 bit addressing, and two additional double-words required for the 64 bit addressing mode.

The fields of the headers, as shown in Tables 5 & 6 are described below the tables.

In alternative embodiments of the hub interface, the fields included in the header of the request packet may vary without departing from the scope of the invention. For example, the header may include additional field, less fields, or different fields in place of the fields shown below. Moreover, the encoding of the fields may also vary without departing from the scope of the invention.

TABLE 5

Request Packet Header Format for 32 bit Addressing

| Last Byte Transmitted | | | | | | | | | | First Byte Transmitted | | |
|---|---|---|---|---|---|---|---|---|---|---|---|---|
| 31 30 29 28 27 26 25 24 | 23 22 21 20 19 18 17 16 | 15 14 13 12 11 10 9 8 | 7 6 5 4 3 2 1 0 | | | | | | | | | |
| rq cp | r/w | cr | af | lk | Transaction Desc. Routing Field | Reserved | TD Attr | Space | Data Length (DW) | Last DW BE | 1st DW BE | Base |
| Addr[31:2] | | | | | | | | | | | R eact | Address |

TABLE 6

Request Packet Header Format for 64 bit Addressing

| Last Byte Transmitted | | | | | | | | | | First Byte Transmitted | | |
|---|---|---|---|---|---|---|---|---|---|---|---|---|
| 31 30 29 28 27 26 25 24 | 23 22 21 20 19 18 17 16 | 15 14 13 12 11 10 9 8 | 7 6 5 4 3 2 1 0 | | | | | | | | | |
| rq cp | r/w | cr | af | lk | Transaction Desc. Routing Field | Reserved | TD Attr | Space | Data Length (DW) | Last DW BE | 1st DW BE | Base |
| Addr[31:2] | | | | | | | | | | | R ea | 32 bit component |
| Addr[63:32] | | | | | | | | | | | | 64 bit component |

| | |
|---|---|
| Transaction Descriptor | The Transaction Descriptor Routing and Attribute fields as previously described. |
| rq/cp | Request packets are identified with a '0' and completion packets with a '1' in this location. |
| cr | Completion required ('1') or no completion required ('0'). |
| r/w | Read ('0') or Write ('1'). This field indicates if data will be included with a completion (read) or request (write). |
| Address Format (af) | The addressing format is either implied ('0') or 32/64 bit ('1'). |
| Lock (lk) | Flag to indicate that the request is part of a locked sequence. Requests and completions in a locked sequence will have this bit set. Hub agents, which do not comprehend lock, ignore this flag and will fill this field with '0'. |
| Data Length | The data length is given in double-words, encoded such that the number of double-words represented is one plus this number. Thus, "000000" represents one double-word. |
| Space | This field selects the destination space type for the request. In one embodiment, possible destination spaces include Memory ("00"), and IO("01"). |
| 1st DW BE | Byte enables for the first double-word of any read or write request to Memory or IO. Byte enables are active low. If there is only one double-word for a request, this byte enable field is used. In one embodiment, it is illegal to issue a Memory or IO read or write request with no bytes enabled. |
| Last DW BE | Byte enables for the last double-word of any read or write request. Byte enables are active low. If there is only one double-word for a request, this field must be inactive ("1111"). Byte enables may be discontiguous (e.g.: "0101"). This field is never used with special cycles since it overlaps the "Special Cycle Encoding" field. |
| Addr[31:2] | The 32 bit address is generated as it would be on PCI for same type of cycle. This double-word is included for the 32 |

-continued

| | |
|---|---|
| | and 64 bit addressing modes (but not for the implied addressing mode). |
| Extended Address (ea) | Indicates 32 bit addressing ('0') or 64 bit addressing ('1'). |
| Config Type (ct) | For configuration cycles only, this bit is used to indicate Type 0 ('0') or Type 1 ('1') configuration cycle type. Because configuration cycles will always be performed with 32 bit addressing, this bit is overlapped with the "Extended Address" bit. |
| Addr[63:32] | Upper address bits for 64 bit addressing mode. This double-word is included for the 64 bit addressing mode. |

Transaction Descriptor The Transaction Descriptor Routing and Attribute fields as previously described.

rq/cp Request packets are identified with a '0' and completion packets with a 1 in this location.

cr Completion required (1) or no completion required (0).

r/w Read (0) or Write (1). This field indicates if data will be included with a completion (read) or a request (write).

Address Format (af) The addressing format is either Implied (0) or 32/64 bit (1).

Lock (lk) Flag to indicate that the request is part of a locked sequence. Requests and completions in a locked sequence will have this bit set. Hub agents, which do not comprehend lock, ignore this flag and will fill this field with '0'.

Data Length The data length is given in double-words, encoded such that the number of double-words represented is one plus this number. Thus, '000000,' represents one double-word.

Space This field selects the destination space type for the request. In one embodiment, possible destination spaces include Memory ("00"), and IO ("01").

1st DW BE Byte enables for the first double-word of any read or write request to Memory or IO. Byte enables are active low. If there is only one double-word for a request, this byte enable field is used. In one embodiment, it is illegal to issue a memory or 10 read or write request with no bytes enabled.

Last DW BE Byte enables for the last double-word of any read or write request. Byte enables are active low. If there is only one double-word for a request, this field must be inactive ("1111"). Byte enables may be discontiguous (e.g.: "0101").

This field is never used with special cycles since it overlaps the "Special Cycle Encoding" field. Addr[31:2] The 32 bit address is generated as it would be on PCI for same type of cycle. This double-word is included for the 32 and 64 bit addressing modes (but not for the implied addressing mode).

Extended Address (ea) Indicates 32 bit addressing (0) or 64 bit addressing (1). Config Type (ct) For configuration cycles only, this bit is used to indicate Type 0 ('0') or Type 1 ('1') configuration cycle type. Because configuration cycles will always be performed with 32 bit addressing, this bit is overlapped with the "Extended Address" bit.

Addr[63:32] Upper address bits for 64 bit addressing mode. This double-word is included for the 64 bit addressing mode.

Completion Packets

The header format for a completion packet, according to one embodiment, is shown below in Table 7. In one embodiment, the header is one double-word. The fields of the headers, as shown in Table 8 are described following the table.

In alternative embodiments of the hub interface, however, the fields included in the header for a completion packet may vary without departing from the scope of the invention. For example, the header may include additional field, less fields, or different fields in place of the fields as described and shown below. Moreover, the encoding of the fields may also vary without departing from the scope of the invention.

TABLE 7

Completion Packet Header Format

| Last Byte Transmitted | | | | | | | | First Byte Transmitted |
|---|---|---|---|---|---|---|---|---|
| 31 30 29 28 27 26 25 24 | 23 22 21 20 19 18 17 16 | 15 14 13 12 11 10 9 8 | 7 6 5 4 3 2 1 0 |
| rq/cp | r/w | Re-served | lk | Transaction Desc. Routing Field | Re-served | TD Attr | Rsvd | Data Length (DW) | Completion Status |

| | |
|---|---|
| Transaction Descriptor | The Transaction Descriptor Routing and Attribute fields as previously discussed in the Transaction section. |
| rq/cp | Completion packets are identified with a '1' in this location. |
| r/w | Read ('0') or Write ('1'). This field indicates if data will be included with a completion (read) or a request (write). |
| Lock (lk) | Flag to indicate that the completion is part of a locked sequence. Requests and completions in a locked sequence will have this bit set. Agents, which do not comprehend lock, ignore this flag and will fill this field with '0'. |

-continued

| | |
|---|---|
| Data Length | The data length is given in double-words, encoded such that the number of double-words represented is one plus this number. Thus, "000000" represents one double-word. |
| Completion Status | Indicates completion status using predetermined. |
| Reserved | All reserved bits are set to '0'. |

Transaction Descriptor The Transaction Descriptor Routing and Attribute fields as previously discussed in the Transaction section.

rq/cp Completion packets are identified with a 1 in this location.

r/w Read (0) or Write (1). This field indicates if data will be included with a completion (read) or a request (write).

Lock (1k) Flag to indicate that the completion is part of a locked sequence. Requests and completions in a locked sequence will have this bit set. Agents, which do not comprehend lock, ignore this flagand will fill this field with '0'.

Data Length The data length is given in double-words, encoded such that the number of double-words represented is one plus this number. Thus, "000000" represents one double-word.

Completion Status Indicates completion status using predetermined . Reserved All reserved bits are set to '0'.

In one embodiment of hub interface, completions for memory reads may provide less than the full amount of data requested so long as the entire request is eventually completed. Likewise, completions for memory writes may indicate that less than the entire request has-been completed. This might be done to satisfy a particular hub interface latency requirement for a particular platform.

In addition, for a request that requires completion, the initiator, in one embodiment, retains information about the request, which may be stored in a buffer of the initiating hub agent. For example, this information may include the transaction descriptor, the size of the packet, lock status, routing information, etc. Furthermore, when receiving the completion(s), the initiator matches the completion(s) with the corresponding request. In the case of multiple completions, the initiator accumulates a count of the data completed for the original request until the original request is fully completed.

Interface Arbitration and Packet Framing

In one embodiment of the hub interface, when the interface is idle, the assertion of a request from either hub agent connected to the interface, is considered an arbitration event. The first agent to request wins ownership of the interface. If agents request ownership simultaneously when the hub interface is idle, the least recently serviced hub agent wins. In one embodiment, all hub agents track the least recently serviced status (e.g., via a status flag of an internal register.) In alternative embodiment, alternative arbitration routines may be used within the scope of the present invention.

Once a hub agent acquires the ownership of the interface, it will continue to own the interface until it completes its transaction, or until an allocated time bandwidth expires. For example, in one embodiment, a timeslice counter is provided in each hub agent to control bandwidth allocation and to limit an agent's interface ownership tenure. The time allotted to a hub agent (i.e., timeslice value) may be different or the same for hub interface agents attached to the same interface. The timeslice counter is started upon acquiring ownership of interface and counts hub interface base clock periods.

In one embodiment, each hub agent is responsible for managing its own timeslice allocation. As such, in one embodiment, a timeslire value may be programmed via a hub interface command register for each interface in each hub agent.

Figure 9:
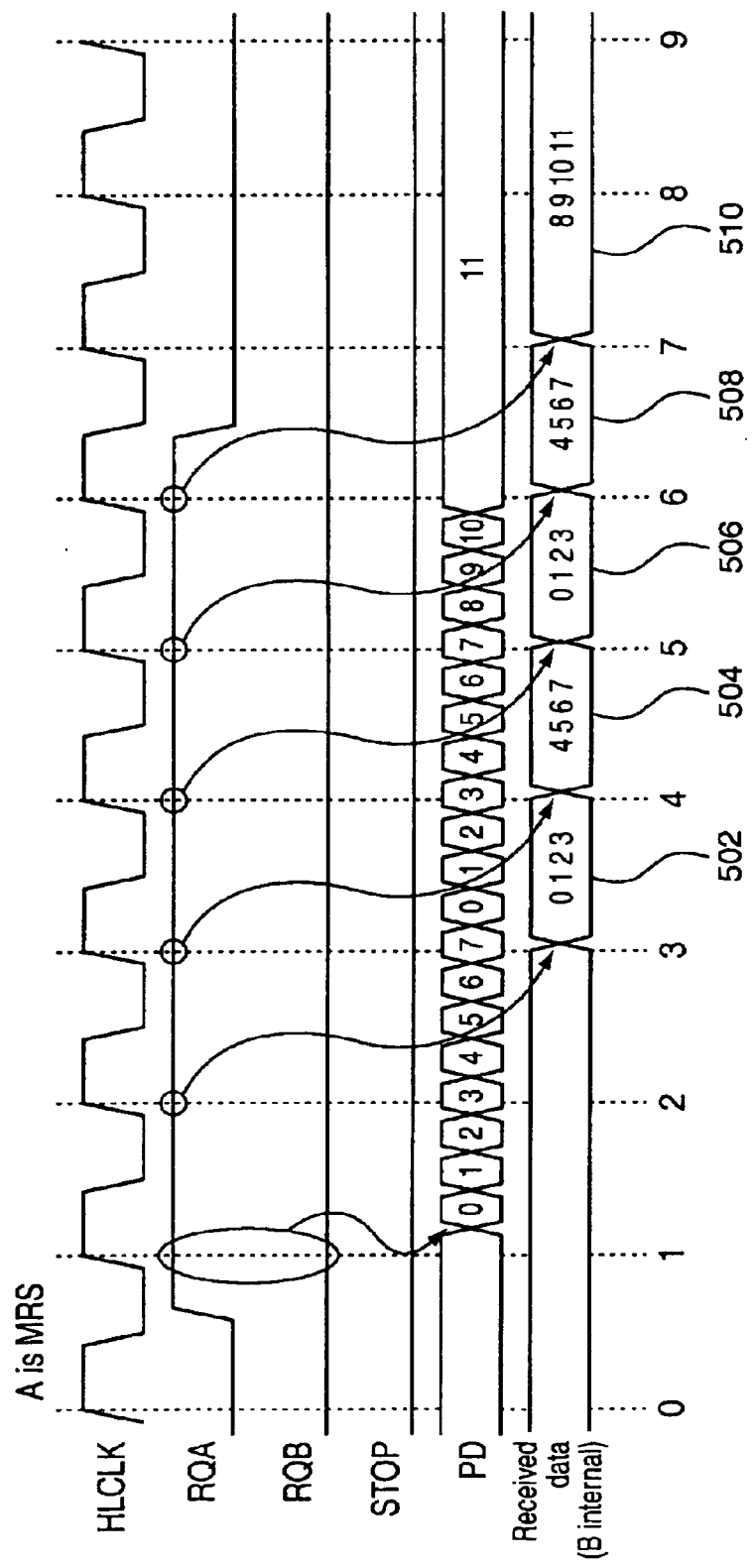
FIG. 9 is a timing diagram illustrating arbitration and transmission of data packets, according to one embodiment.

FIG. 9 illustrates an example of arbitration for the hub interface between hub agent A and agent B and the transfer of two packets. The example illustrates arbitration out of an idle interface state, with the interface then returning to idle. Moreover, in the example illustrated, the interface is using a 4x data transfer mode with eight bit data signal (PD) path. Agent A, in the example illustrated in FIG. 9, is the most recently serviced (MRS) agent. As a result, Agent A asserts its external request signal (RQA) and samples the state of the Agent B's request signal (RQB) on clock edge 1 (which is shown to be inactive) before starting packet transmission off the same edge.

In one embodiment, there is a two clock delay before the transmitted data (i.e., data from Agent A) is available internally in the receiver (i.e., Agent B), starting from clock edge 3. The first packet consists of two double-words 502 and 504 and requires two base clocks to transmit in the 4 xmode. The second packet is three double-words 506, 508, and 510, and so requires three base clocks in the 4 xmode.

Flow Control

In one embodiment, packets may be retried or disconnected by a receiving agent due to lack of request queue space, data buffer space, or for other reasons. In one embodiment, Flow control is accomplished using a STOP signal.

Figure 10:
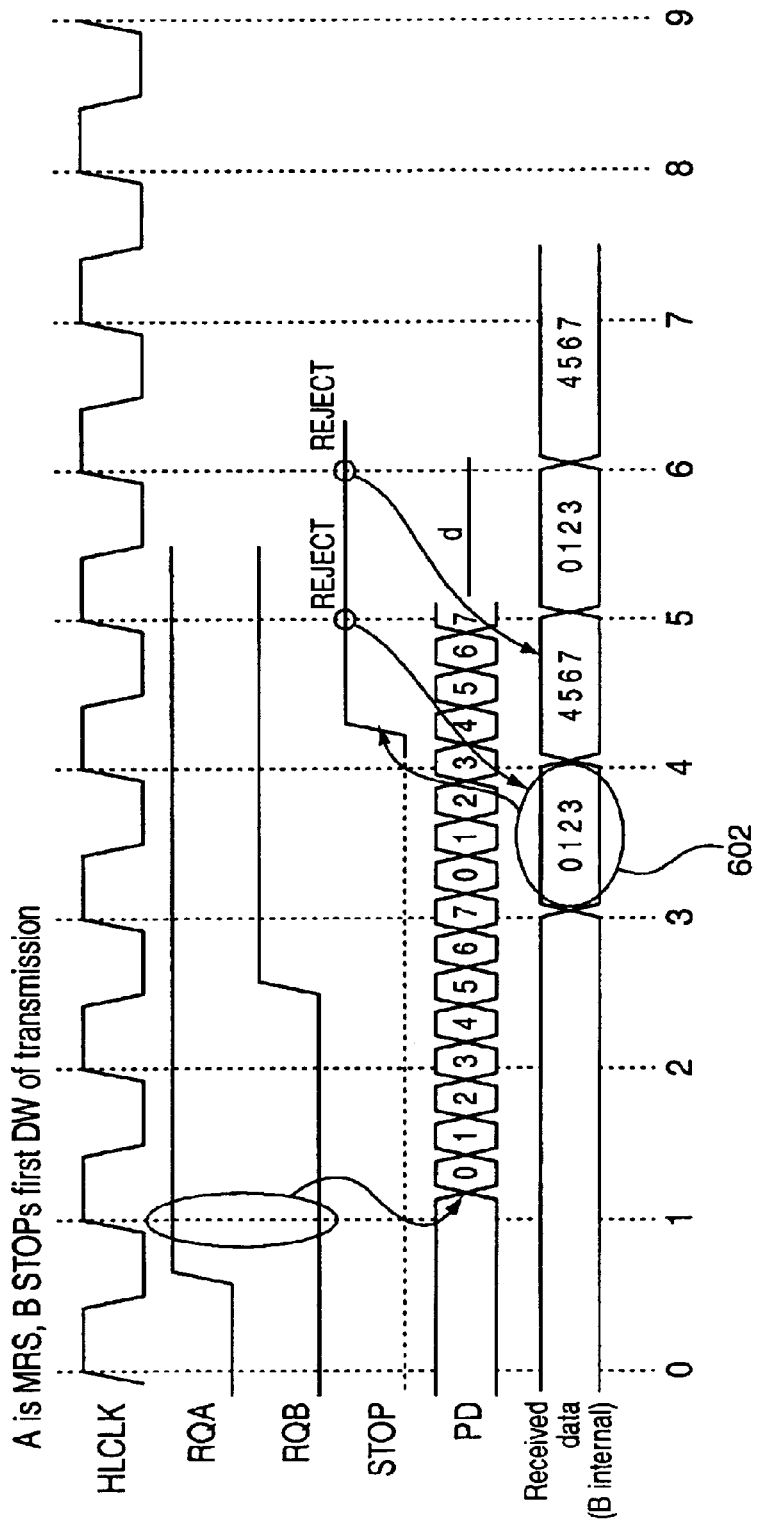
FIG. 10 is a timing diagram illustrating flow control of data packets, according to one embodiment.

FIG. 10 illustrates an example of the use of STOP signal. As illustrated, Agent A asserts its external request signal (RQA) and samples the state of the Agent B's request signal (RQB) on clock edge 1 (which is shown to be inactive) before starting packet transmission off the same edge (e.g., clock edge 1.)

Following a two clock delay, the data transmitted from Agent A is available internally in the receiver at Agent B, starting from clock edge 3. In one embodiment, following receipt of data transmitted from Agent A, is the first opportunity for Agent B to enact flow control by asserting the STOP signal, as illustrated in FIG. 10, at clock edge 4.

In addition, when ownership of PD signal changes from one hub agent to another, ownership of the STOP signal will be also be exchanged following a predetermined number of clocks. Moreover, in one embodiment, the STOP signal is sampled on base clocks, which correspond to the final transfer of a packet width. For example, in a 4 xmode (using an eight bit wide PD signal), the STOP signal is sampled each base clock. However, for a 1xmode, the STOP signal is sampled each fourth clock (with the beginning of a transaction being used as a reference point).

Figure 11:
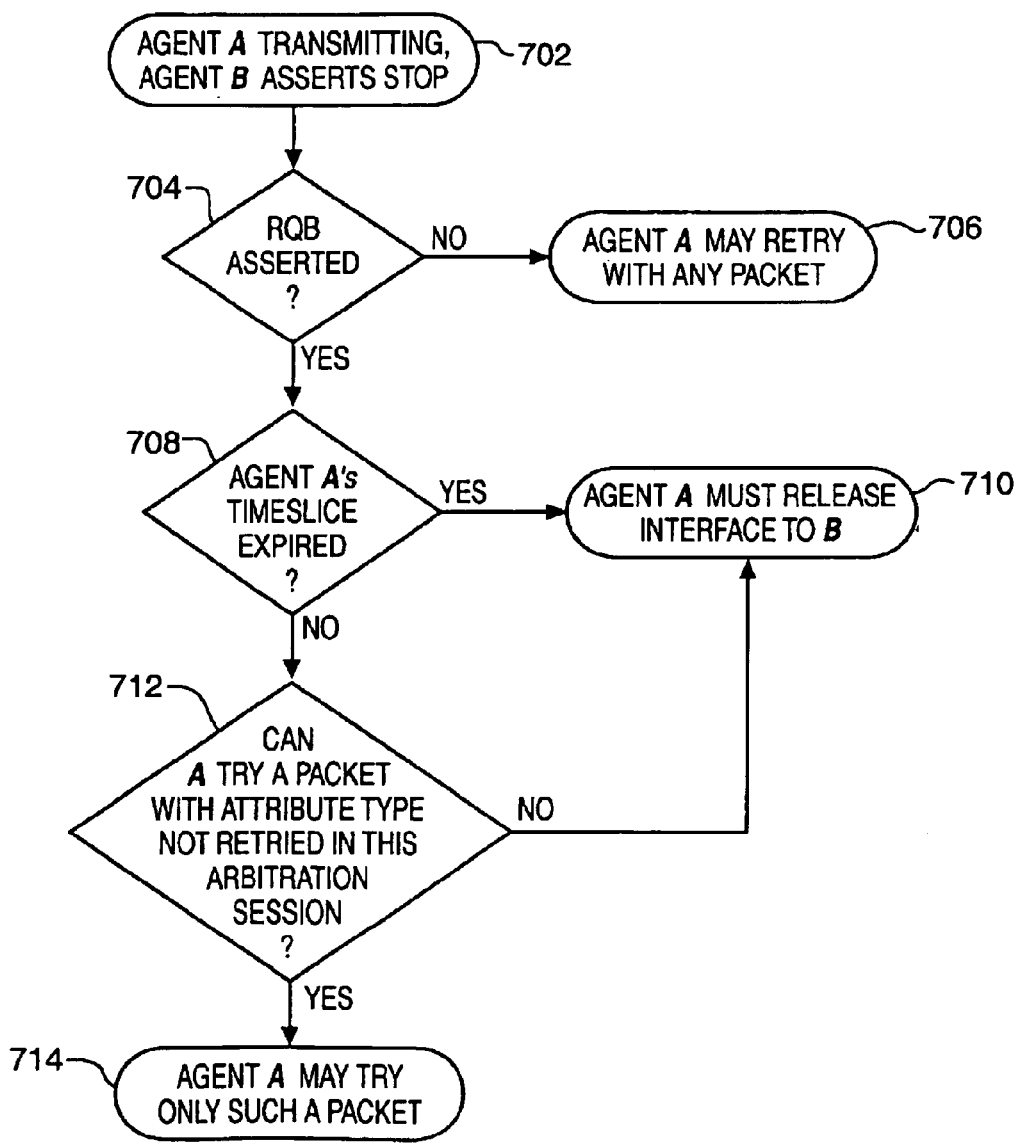
FIG. 11 illustrates a flow diagram describing the steps of responding to flow control operations according to one embodiment.

Following the reception of a STOP signal, the hub agent that receives the STOP signal determines whether it may retry sending additional packets. FIG. 11 is a flow diagram describing the steps performed by a hub agent in determining whether it may retry sending a packet following receipt of a STOP signal, according to one embodiment.

In step 702, a hub agent that is currently transmitting packets receives a STOP signal. In response, in step 704 the hub agent that receives the STOP signal determines if the other agent (which activated the STOP signal) is requesting ownership of the interface, by sampling the other hub agents request signal (e.g., RQB.)

If the recipient of the STOP signal determines that the agent which sent the STOP signal is not requesting ownership of the interface, in step 706 the current owner of the interface may attempt to transmit a packet following recovery from the STOP. On the other hand, if it is determined that the agent which activated the STOP signal is requesting ownership, in step 708, the current owner determines if its timeslice has expired.

If the timeslice for the current owner of the interface has expired, in step 710, the current owner releases ownership. If the timeslice for the current owner has not expired, the current owner may transmit a packet with an attribute that is different from the interrupted packet. More specifically, in step 712, the current owner determines if it has a packet with a attribute type that is different from any packets that have been retried in the present arbitration session (i.e., the period of the current owner's tenure), which needs to be transmitted.

If the current owner does have a packet with a different attribute, in step 714 the current owner may attempt to transmit the packet. Otherwise, the current owner release ownership of the interface.

Physical Interface

In one embodiment, the hub interface implements a physical interface that operates at a base frequency of either 66MHz or 100MHz. Other frequencies may also be used. In addition, in one embodiment, the physical interface uses a source synchronous (SS) data transfer technique which can be quad-clocked to transfer data at 4× of the base hub interface clock. As a result, in an embodiment having an 8-bit data interface (e.g., PD) operating at a base frequency of 66MHz or 100MHz, a bandwidth of 266 megabytes per second (MB/s) or 400MB/s may be achieved, respectively.

Furthermore, in one embodiment, the hub interface supports a voltage operation of 1.8V, and is based on complementary metal-oxide semiconductor process (CMOS) signaling. In an alternative embodiments, however, the interface may operate at alternative frequencies and/or alternative sized data interfaces to provide varying bandwidths, and support alternative operating voltages, based on alternative signal processing, without departing from the scope of the invention.

External Signals Definition

Figure 12:
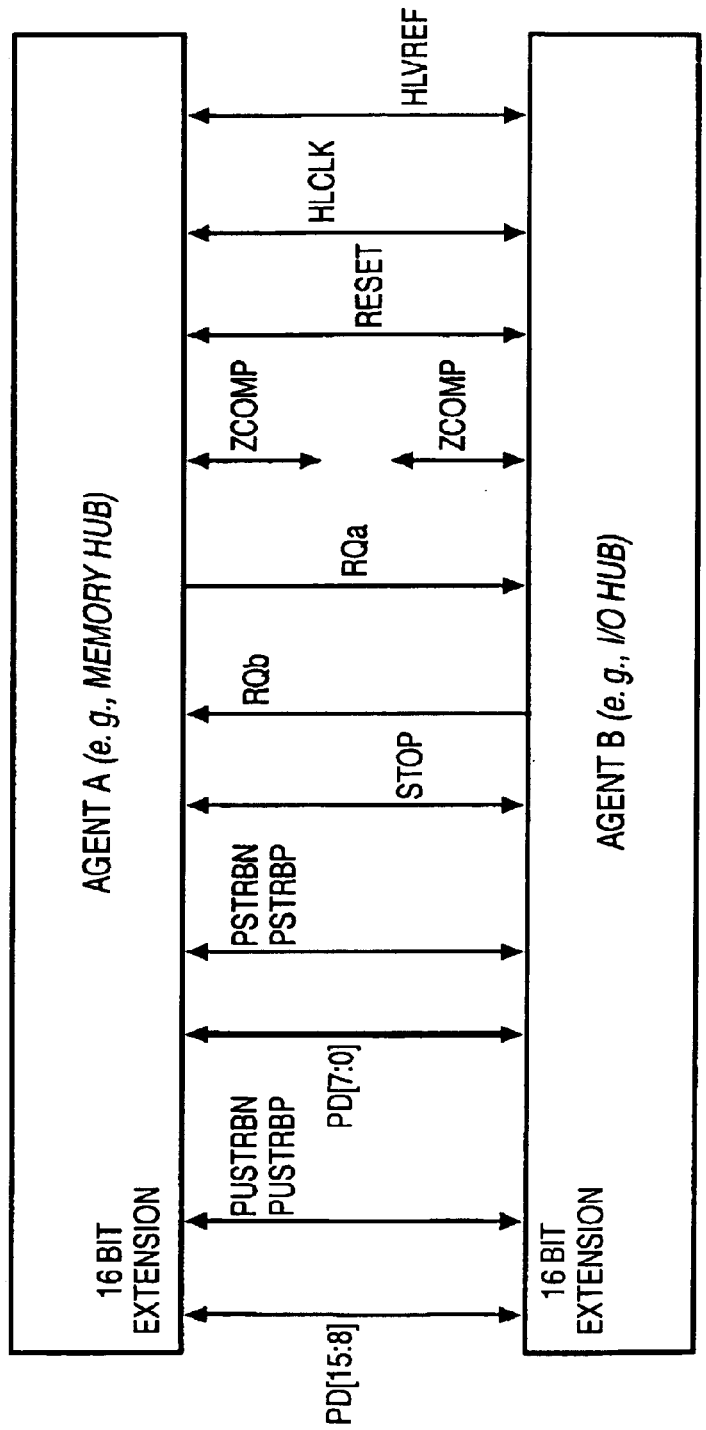
FIG. 12 illustrates the physical signal interface according to one embodiment.

FIG. 12 illustrates the physical signal interface of the hub interface between two hub agents, according to one embodiment. As shown in FIG. 12, the hub interface physical interface uses a bidirectional eight bit data bus (PD [7:0]) with a differential pair of source synchronous strobe signals (PSTRBN, PSTRBP) for data clocking. In an alternative embodiment, the interface can widened. For example, as shown in FIG. 12, an additional eight bit data bus (PD [15:8]) can also be used along with an additional pair of pair of source synchronous strobe signals (PUSTRBN, PUSTRBP.) Moreover, in an alternative embodiment, unidirectional data signals could be used.

In addition, one unidirectional arbitration signal connects each agent to the other (RQa, RQb), and a bidirectional STOP signal is used by the receiving agent to control data flow, as previously described. Additional interface signals include the system reset (Reset), common clock (HLCLK) and voltage reference signals (HLVREF). As well, signals for each hub agent (ZCOMP) to match its driver output impedance to the appropriate value to compensate for manufacturing and temperature variations, are also included.

The physical signals shown in the interface illustrated in FIG. 12 are further described below in Table 8. In aternative embodiments of the hub interface; the signals included in the physical interface may vary without departing from the scope of the invention. For example, the physical interface may include more, less or different signals varying from the signals shown in FIG. 12 and further described below in Table 8.

TABLE 8

| | Hub interface Signals for Eight Bit Agents | | | |
|---|---|---|---|---|
| Name | Bits (Pads) | Type | Clock Mode | Description |
| PD[7:0] | 8 | ASTS[1] | SS[2] | Packet data pins. The data interface when idle, in one embodiment, is held by active sustainers at the last voltage value to which it was driven. |
| PSTRBP | 1 | ASTS | SS | Negative PD Interface Strobe (default voltage level = VSSHL) and Positive PD Interface Strobe (idle voltage level = VCCHL) together provide timing for 4X and 1X data transfer on the PD[7:0] interface. The agent that is providing data drives this signal. PSTRBN and PSTRBP should be sensed fully differentially at the receiver. |
| PSTRBN | 1 | ASTS | SS | Positive PD Interface Strobe, see PSTRBP description above. |
| RQa | 1 | I/O | CC[3] | Active-high request from agent A (output from A, input to B) to obtain ownership of the hub interface. RQa is asserted when agent A has data available to send, and is deasserted when either all of agent A's data has been sent or agent A determines that it should release the interface. Reset voltage value is VSSHL. |
| RQb | 1 | I/O | CC | Request from agent B (output from B, input to A). See above description of RQa. |
| STOP | 1 | ASTS | CC | Used for pipelined flow control to retry or disconnect packets. |
| HLCLK | 1 | I | N/A | hub interface base clock, in one embodiment, either 66 MHz or 100 MHz. This provides timing information for the common clock signals (described further below. |

TABLE 8-continued

Hub interface Signals for Eight Bit Agents

| Name | Bits (Pads) | Type | Clock Mode | Description |
|---|---|---|---|---|
| RESET# | 1 | I | CC | Active-low reset indication to hub interface agents.[4] |
| HLVREF | 1 | I | N/A | Voltage reference (VCCHL/2) for differential inputs. In one embodiment, the voltage is generated on the motherboard through a voltage divider. |
| HLZCOMP | 1 | I/O | N/A | Provides Impedance Compensation. |
| VCCHL | 4 | power | N/A | 1.8 V |
| VSSHL | 4 | ground | N/A | |
| Total: | 25 | | | |

[1]ASTS = Actively Sustained Tri-State.
[2]SS = Source Synchronous Mode Signal
[3]CC = Common Clock Mode Signal
[4]In one embodiment, Reset is a system-wide signal; it is an output from one component of the system and an input to the other component(s). Moreover, Reset is asynchronous with respect to HLCLK.

Common Clock Transfer Mode Operation

In one embodiment, many of the signals transmitted across the hub interface are transmitted in accordance with a common clock mode. More specifically, the timing of the signals that are transmitted via the common clock mode are referenced to a single clock (e.g., the hub interface clock.) In alternative embodiments, the signals may be tied to a system clock, exterior to the hub interface agents. Moreover, there may be more than one hub interface segment in a system, in which case different base clocks may be used for the different segments. For example, one component might implement both a 66MHz base hub interface and a 100MHz base hub interface.

Source Synchronous Transfer Mode Operation

In one embodiment, the packets/data are transmitted using a source synchronous clock mode, which provides a technique for multiplying the data transfer rate of data. For example, in an embodiment using 4× source synchronous clocking mode with an eight bit data signal path, transmitting a double-word (i.e., four byte) requires only one hub interface clock cycle (HLCK.) Alternatively, transmitting a double word using 1× source synchronous clocking mode on an eight bit data signal path would require a full hub interface clock cycle to complete.

More specifically, in one embodiment of source synchronous transmission, strobes (e.g., PSTRBN/PSTRBP) are sent with a data transmission in accordance with a predetermined timing relationship between the strobes and the data. The strobes are thereafter used by the receiving hub agent to latch the data into the receiving hub agent.

More specifically, in one embodiment, the edges of the strobes PSTRBP/PSTRBN are used by the receiving hub agent to identify the presence and timing of data being transferred across the data signal paths. For example, as illustrated in the timing diagram of FIG. 13, in one embodiment a first data transfer corresponds to the rising edge of PSTRBP and the falling edge of PSTRBN. A second data transfer corresponds to the rising edge of PSTRBN and the falling edge of PSTRBP.

Figure 13:
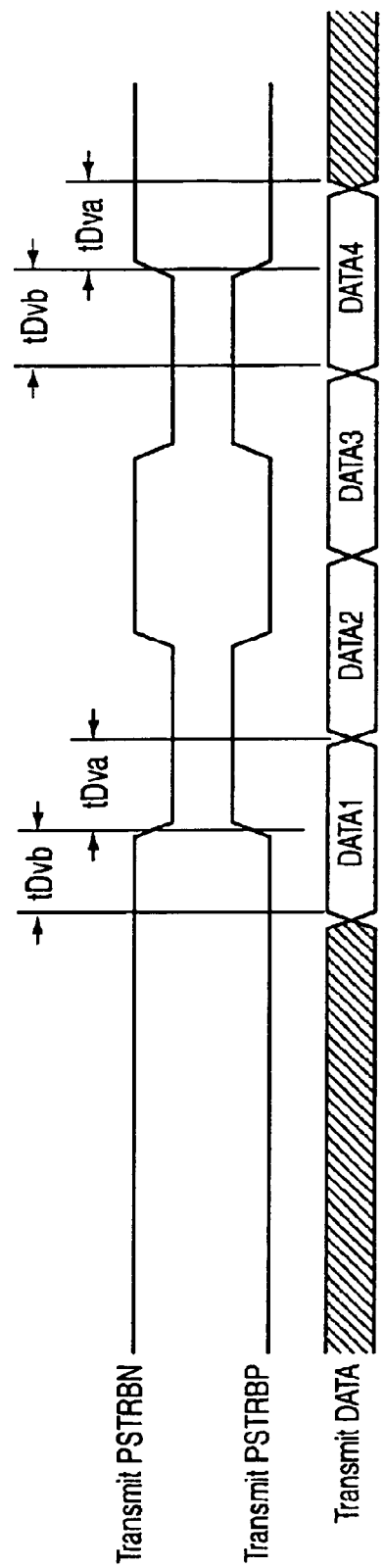
FIG. 13 is a timing diagram illustrating source synchronous clocking according to one embodiment.

In addition, in one embodiment, as further shown in FIG. 13, the transmit edges of the strobes PSTRBP/PSTRBN are positioned near the center of the data valid window. As a result, the receiving agent is given an input data sampling window to accommodate various system timing skews. Moreover, in one embodiment a minimum data valid before strobe edge (tDvb), and a minimum data valid after strobe edge (tDva) are also used by the receiving hub agent to identify and latch data being transmitted. Once the receiving hub agent latches the incoming data, the data is thereafter held for brief period to resynchronize the data with the hub interface clock (HLCK) before being passed along within the hub agent.

Figure 14:
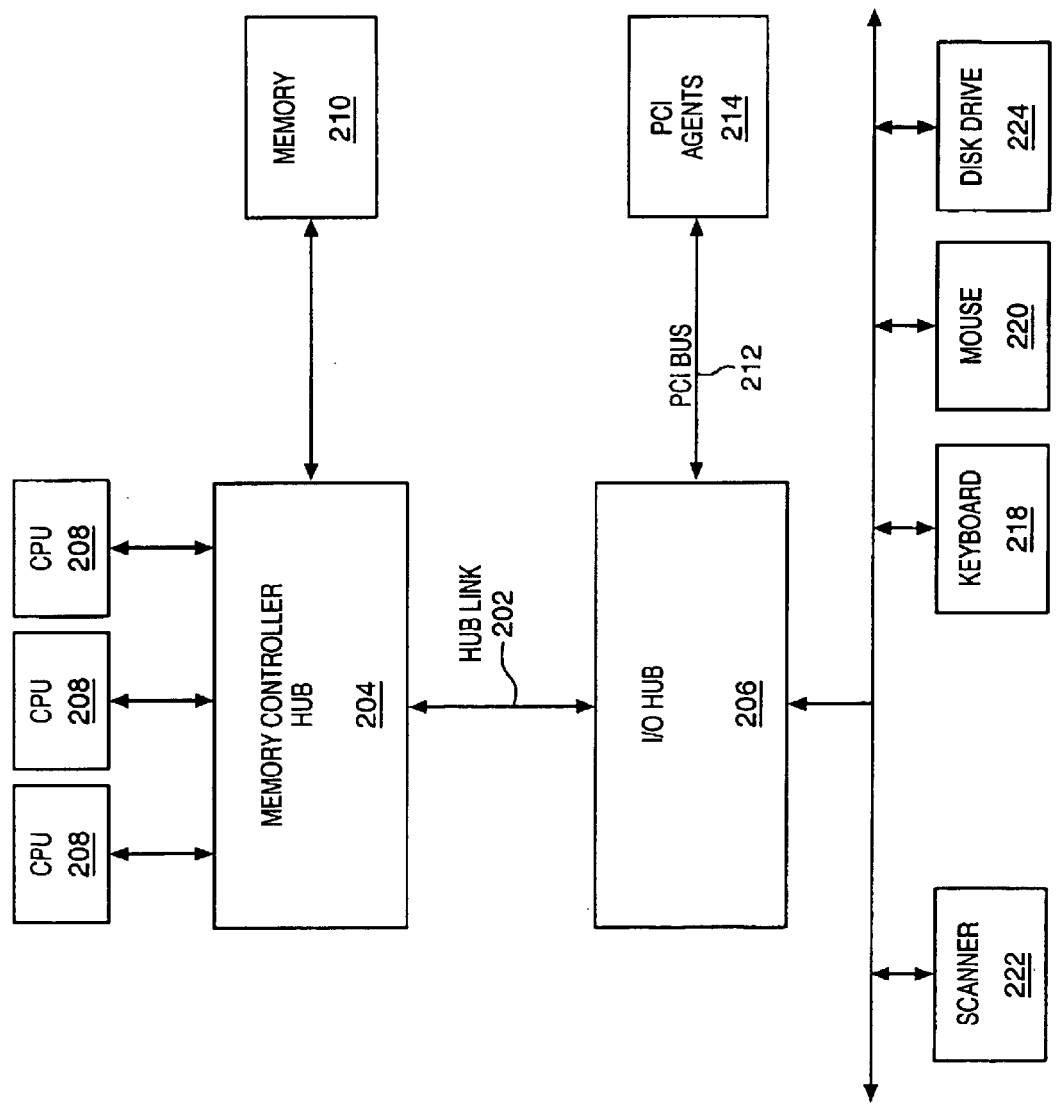
FIG. 14 illustrates a computer system having multiple processors implementing an improved interface between computer components according to one embodiment.

In the foregoing detailed description, the method and apparatus of the present invention has been described with reference to specific exemplary embodiments thereof. It will, however, be evident that various modifications and changes may be made thereto without departing from the broader spirit and scope of the present invention. For example, the hub interface, according to one embodiment, may be implemented in a computer system having multiple processors, as illustrated in FIG. 14. The present specification and figures are accordingly to be regarded as illustrative rather than restrictive.

What is claimed is:

1. A system comprising:
   a processor;
   a processor bus coupled to the processor;
   a memory;
   a memory control hub coupled to the processor bus and coupled to the memory;
   a graphics accelerator coupled to the memory control hub;
   a bus coupled to the memory control hub, the bus to transmit packets;
   an input-output hub coupled to the bus and to couple to an input-output device, wherein the system is capable of passing messages between the memory control hub and the input-output hub through packets transmitted on the bus, the messages including information about signals received from one or more of the processor, the memory, and the input-output device.
   wherein the bus is capable of using a source synchronous (SS) data transfer technique that is capable of being quad-clocked.

2. A system comprising;
   a first hub to receive a first signal;
   a first hub interface coupled to the first hub, the first hub interface to receive a message that is passed from the first hub, the message corresponding to the first signal, the message including a packet including control information;
   a second hub coupled to the first hub interface, the second hub to receive the message from the first hub interface,
   wherein the packet including the control information comprises a special cycle packet embodying virtual wire control information.

3. The system of claim 2, wherein the virtual wire control information is in place of a wired sideband control.

4. The system of claim 2, wherein the packet including control information includes a special cycle packet encoding a command to assert a PHLD signal.

5. A system comprising:
   a first hub to receive a first signal;
   a first hub interface coupled to the first hub, the first hub interface to receive a message that is passed from the first hub, the message corresponding to the first signal, the message including a packet including control information;

a second hub coupled to the first hub interface, the second hub to receive the message from the first hub interface, wherein the first hub interface is capable of using a source synchronous (SS) data transfer technique that is capable of being quad-clocked.

6. A system comprising:

a first hub to receive a first signal;

a first hub interface coupled to the first hub, the first hub interface to receive a message that is passed from the first hub, the message corresponding to the first signal, the message including a special cycle packet including control information;

a second hub coupled to the first hub interface, the second hub to receive the message from the first hub interface a second hub interface coupled to the second hub, the second hub interface to receive the message from the second hub; and a third hub coupled to the second hub interface to receive the message from the second hub interface, wherein the message includes control information to control the second hub, and the third hub to act as if SERR# was received.

7. An apparatus comprising:

a first component;

a bus coupled to the first component, the bus to transmit packets, the packets including special cycle packets embodying control information; and a second component coupled to the bus, the second component to receive the packets from the first component via the bus, wherein the bus is capable of using a source synchronous (SS) data transfer technique that is capable of being multi-clocked.

8. The apparatus of claim 7, wherein the first component comprises a memory control hub, and wherein the second component comprises an input-output hub.

9. The apparatus of claim 8, further comprising:

a graphics accelerator coupled to the first component; and a FLASH bios coupled to the second component.

10. A method comprising:

receiving a first signal at a first hub coupled to a hub interface;

passing a message corresponding to the first signal from the first hub through the first hub interface, the message including a packet including control information; and receiving the message from the hub interface at a second hub coupled to the hub interface, wherein the control information embodies virtual wire control information.

11. The method of claim 10, further comprising: checking the packet for a special cycle; and if a special cycle is found, then processing the special cycle.

12. A method comprising:

receiving a first signal at a first hub coupled to a hub interface;

passing a message corresponding to the first signal from the first hub through the first hub interface, the message including a packet including control information wherein the packet including the control information comprises a special cycle packet embodying virtual wire control information;

receiving the message from the hub interface at a second hub coupled to the hub interface;

determining if the message is intended for the second hub;

acting on the message if said determining indicates the message is intended for the second hub; and passing the message through a second hub interface if the determining indicates the message is not intended for the second hub.

13. The system of claim 2, wherein the packet comprises a special cycle packet encoding a command to assert a PHLD signal.

14. The system of claim 2, wherein the packet comprises a special cycle packet encoding a command to act as if SERR# was received.

15. The system of claim 2, further comprising a bus capable of using a packet-based split-transaction protocol.

16. The system of claim 2, wherein the first hub comprises a memory control hub, and wherein the second hub comprises an input-output hub.

17. The system of claim 5, wherein the packet comprises a special cycle packet encoding a command to assert a PHLD signal.

18. The system of claim 5, wherein the packet comprises a special cycle packet encoding a command to act as if SERR# was received.

19. The system of claim 5, further comprising a bus capable of using a packet-based split-transaction protocol.

20. The system of claim 5, wherein the first hub comprises a memory control hub, and wherein the second hub comprises an input-output hub.

21. The system of claim 6, wherein the packet comprises a special cycle packet encoding a command to assert a PHLD signal.

22. The system of claim 6, wherein the packet comprises a special cycle packet encoding a command to act as if SERR# was received.

23. The system of claim 6, further comprising a bus capable of using a packet-based split-transaction protocol.

24. The system of claim 6, wherein the first hub comprises a memory control hub, and wherein the second hub comprises an input-output hub.

* * * * *